(12) United States Patent
Oguchi

(10) Patent No.: US 11,714,253 B2
(45) Date of Patent: Aug. 1, 2023

(54) LASER LINE GENERATOR AND METHOD FOR ADJUSTING ANGLE OF CONVERSION LENS OF LASER LINE GENERATOR

(71) Applicant: MAKITA CORPORATION, Anjo (JP)

(72) Inventor: Kazuki Oguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 680 days.

(21) Appl. No.: 16/816,414

(22) Filed: Mar. 12, 2020

(65) Prior Publication Data

US 2020/0310076 A1 Oct. 1, 2020

(30) Foreign Application Priority Data

Mar. 28, 2019 (JP) ................................ 2019-063717

(51) Int. Cl.
| | | |
|---|---|---|
| G02B 7/00 | (2021.01) | |
| G02B 7/02 | (2021.01) | |
| G01C 15/00 | (2006.01) | |
| B23K 26/06 | (2014.01) | |

(52) U.S. Cl.
CPC .......... *G02B 7/023* (2013.01); *B23K 26/0648* (2013.01); *G01C 15/004* (2013.01)

(58) Field of Classification Search
CPC .......... G02B 7/004; G02B 7/005; G02B 7/02; G02B 7/021; G02B 7/023; G02B 7/04; G02B 7/06; G02B 7/08; G02B 7/09; G02B 7/10; G02B 7/102; G02B 7/105; G02B 7/12; G03B 30/00; G11B 7/085; G11B 7/09; G01C 15/004; B23K 26/362; B23K 26/04; B23K 26/70; B23K 26/0648

USPC ............................................. 359/822; 33/290
See application file for complete search history.

(56) References Cited

U.S. PATENT DOCUMENTS

| | | | |
|---|---|---|---|
| 7,055,252 B2 * | 6/2006 | Wu ........................ | G01C 15/00 33/286 |
| 7,696,450 B2 * | 4/2010 | Ushiwata ................. | B26D 7/01 219/121.85 |
| 2006/0070251 A1 * | 4/2006 | Wu ....................... | G01C 15/004 33/286 |
| 2009/0100692 A1 * | 4/2009 | Tamamura ........... | G01C 15/004 33/299 |
| 2019/0126395 A1 * | 5/2019 | Nakamura ............. | B23K 26/21 |

FOREIGN PATENT DOCUMENTS

| | | | |
|---|---|---|---|
| JP | 2002-221416 A | | 8/2002 |
| JP | 2002221416 A | * | 8/2002 |
| JP | 2003317266 A | * | 11/2003 |
| JP | 3212651 U | * | 9/2017 |

* cited by examiner

*Primary Examiner* — Thomas K Pham
*Assistant Examiner* — Henry Duong
(74) *Attorney, Agent, or Firm* — Oliff PLC

(57) ABSTRACT

One aspect of the present disclosure provides a laser line generator that includes a laser beam source, a conversion lens, a lens holder, a rotation axis, a rotation support, a biasing portion, and a gap adjuster. The rotation support abuts the rotation axis and supports the lens holder such that the lens holder rotates about the rotation axis. The biasing portion brings the lens holder and the rotation support closer to each other. The gap adjuster adjusts a gap dimension between the lens holder and the rotation support that are brought closer to each other by the biasing portion.

20 Claims, 14 Drawing Sheets

LASER LINE GENERATOR AND METHOD FOR ADJUSTING ANGLE OF CONVERSION LENS OF LASER LINE GENERATOR

CROSS-REFERENCE TO RELATED APPLICATIONS

The present application claims the benefit of Japanese Patent Application No. 2019-063717 filed on Mar. 28, 2019 with the Japan Patent Office, the entire disclosure of which is incorporated herein by reference.

BACKGROUND

The present disclosure relates to a laser line generator.

Japanese Unexamined Patent Application Publication No. 2002-221416 discloses a laser line generator that includes a mechanism to adjust a relative position (such as an angle) of a conversion lens with respect to an optical axis of an incident laser beam. More specifically, for example, there are disclosed a first mechanism to adjust a lens angle using two adjustment screws, and a second mechanism to adjust a lens angle using a hinge shaft and a screw.

SUMMARY

The first mechanism requires separately adjusting the two adjustment screws, and thus may lead to a complicated angle adjustment operation.

Also, the second mechanism includes a specified gap for smooth rotation of the hinge shaft, and the gap may cause movement of the lens along a roll direction. As a result, the second mechanism may allow irregular movement of the lens, thus failing to adjust the lens angle properly.

Accordingly, in one aspect of the present disclosure, it is preferable to enable easy adjustment of a lens angle in a laser line generator.

A laser line generator (or a laser level, or a laser marker) in one aspect of the present disclosure includes a laser beam source, a conversion lens, a lens holder, a rotation axis, a rotation support, a biasing portion, and/or a gap adjuster.

The laser beam source generates an incident laser beam having an optical axis. The conversion lens converts the incident laser beam into a reference laser beam. The reference laser beam diffuses from the conversion lens so as to form a plane. The lens holder holds the conversion lens. The rotation axis abuts the lens holder. The rotation axis is perpendicular to the optical axis and parallel to the plane. The rotation support abuts the rotation axis. The rotation support supports the lens holder such that the lens holder rotates relative to the rotation axis.

The biasing portion abuts the lens holder and the rotation support in a first area. The biasing portion generates a biasing force to bring the lens holder and the rotation support closer to each other. The first area is positioned on an imaginary plane perpendicular to the optical axis. The imaginary plane is divided into the first area and a second area by the rotation axis. The gap adjuster adjusts a gap dimension between the lens holder and the rotation support in the first area.

According to the laser line generator configured as described above, by adjusting the gap dimension using the biasing portion and the gap adjuster, it is possible to adjust a resting position of the lens holder along a first rotational direction relative to the rotation axis, and also to adjust a position of the conversion lens and an attitude of the conversion lens.

That is, the laser line generator enables adjustment of a relative position of the conversion lens relative to the optical axis (more specifically, a relative angle of the conversion lens relative to the optical axis) by a simple method of adjusting the gap dimension, and enables adjustment of a rotation angle (or an orientation) of the reference laser beam relative to the rotation axis.

Accordingly, the above-described laser line generator facilitates angle adjustment operation of the conversion lens with a simple configuration, thus limiting increase in workload of a user of the laser line generator. Also, according to the laser line generator, the simple configuration enables reduction in errors due to deformation of components, and thus proper adjustment of a lens angle and proper adjustment of the rotation angle (or the orientation) of the reference laser beam relative to the rotation axis can be achieved.

The rotation axis may include a first sphere and a second sphere. Each of the first sphere and the second sphere may abut the lens holder and the rotation support. The lens holder may include a first sphere abutment portion and a second sphere abutment portion. The first sphere abutment portion may abut the first sphere, and the second sphere abutment portion may abut the second sphere. The rotation support may include a third sphere abutment portion and a fourth sphere abutment portion. The third sphere abutment portion may abut the first sphere, and the fourth sphere abutment portion may abut the second sphere.

Upon positioning of the first sphere and the second sphere at the third sphere abutment portion and the fourth sphere abutment portion, respectively, the rotation axis passes through the first sphere and the second sphere. The lens holder rotates relative to the rotation axis. Thus, adjustment of the resting position of the lens holder along the first rotational direction can be achieved, and adjustment of the position of the conversion lens and the attitude of the conversion lens can be achieved.

Each of the first sphere and the second sphere may include a first part and a second part. The first sphere abutment portion may include a first recess receiving the first part of the first sphere. The second sphere abutment portion may include a second recess receiving the first part of the second sphere. The third sphere abutment portion may include a third recess receiving the second part of the first sphere. The fourth sphere abutment portion may include a fourth recess receiving the second part of the second sphere. The first recess and/or the third recess may include a conical recess. The second recess and/or the fourth recess may include a conical recess or a V-groove recess. The V-groove recess may provide a space having a V-shaped groove section.

For example, in the above-described laser line generator, the lens holder may be configured such that each of the first recess and the second recess includes the conical recess, and the rotation support may be configured such that the third recess includes the conical recess and the fourth recess includes the V-groove recess. Alternatively, the lens holder may be configured such that the first recess includes the conical recess, and the second recess includes the V-groove recess, and the rotation support may be configured such that each of the third recess and the fourth recess includes the conical recess.

According to the laser line generator, the first sphere is positioned by the first recess and the third recess. The second sphere is positioned by the second recess and the fourth recess. An abutment position of the V-groove recess with the second sphere is changeable along an extending direction of the V-groove recess. Thus, if machining errors (manufacturing errors) occur in a formed position of the first sphere abutment portion in the lens holder and/or a formed position of the third sphere abutment portion in the rotation support, the abutment position of the second sphere in the second recess or the fourth recess may be changed to a proper position.

Accordingly, the laser line generator enables proper positioning of the first sphere and the second sphere between the lens holder and the rotation support.

The biasing portion may include a first fixing end and a second fixing end. The first fixing end may be fixed to the lens holder. The second fixing end may be fixed to the rotation support. In addition, the biasing portion may be elastically deformed to bring the first fixing end and the second fixing end closer to each other.

According to the laser line generator, a distance (that is, the gap dimension) between the lens holder and the rotation support in the first area can be reduced by the biasing portion configured to be elastically deformed as described above.

The biasing portion may abut any two portions of the lens holder and any two portions of the rotation support in the first area. Such an arrangement of the biasing portion leads to an increased force to reduce the distance between the lens holder and the rotation support, as compared with an arrangement in which the biasing portion abuts any one portion of the lens holder and any one portion of the rotation support.

The gap adjuster may include a female-threaded portion and a male-threaded portion. The female-threaded portion may be provided in the lens holder or the rotation support. The male-threaded portion may abut the lens holder and the rotation support. The male-threaded portion may be screw-engaged with the female-threaded portion. The male-threaded portion may include a first abutment portion and a second abutment portion. The first abutment portion may abut the lens holder. The second abutment portion may abut the rotation support. A distance between the first abutment portion and the second abutment portion may change as a screwing depth of the male-threaded portion relative to the female-threaded portion changes.

That is, the gap adjuster may be configured such that the distance between the first abutment portion and the second abutment portion in the male-threaded portion changes by changing the screwing depth of the male-threaded portion relative to the female-threaded portion. As a result, by changing the screwing depth, it is possible to change the distance between the first abutment portion and the second abutment portion and also is possible to adjust the gap dimension between the lens holder and the rotation support. The screwing depth corresponds to an amount of the male-threaded portion that is screwed into the female-threaded portion.

Accordingly, the laser line generator allows change of a rotation angle of the lens holder relative to the rotation axis by adjusting the screwing depth.

The gap adjuster may be arranged in the first area. In this case, the distance between the lens holder and the rotation support in the first area may be adjusted directly by the gap adjuster.

The rotation axis may include a first end and a second end. The lens holder may include an abutting portion to abut the gap adjuster. An action center position of the biasing force acting on the lens holder may be located within an imaginary triangle area. Respective apexes of the imaginary triangle area may correspond to the first end of the rotation axis, the second end of the rotation axis, and the abutting portion.

The laser line generator configured as above can inhibit the biasing force from unevenly acting on the lens holder. Thus, it is possible to inhibit the lens holder from tilting in an improper direction, and also is possible to inhibit the conversion lens from being positioned improperly.

The distance between the first abutment portion and the second abutment portion may increase as the screwing depth increases. In response to the increase in the distance between the first abutment portion and the second abutment portion, the distance between the lens holder and the rotation support in the first area may increase. Thus, according to the laser line generator, the rotation angle of the lens holder relative to the rotation axis can be changed by adjusting the screwing depth.

The male-threaded portion may include a screw shaft having a male thread groove, and a shaft end abutment portion provided at a shaft end of the screw shaft. The screw shaft may include a first shaft end and the male thread groove. The shaft end abutment portion may be provided at the first shaft end. In a case where the female-threaded portion is provided in the lens holder, the screw shaft may be screw engaged with the female-threaded portion, and the shaft end abutment portion may abut the rotation support. In this case, a part of the screw shaft from a screw engaging portion with the female-threaded portion to the shaft end abutment portion is arranged between the lens holder and the rotation support. Accordingly, it is possible to restrict the lens holder from becoming closer to the rotation support. The screw engaging portion with the female-threaded portion in the screw shaft corresponds to the first abutment portion. The shaft end abutment portion in the screw shaft corresponds to the second abutment portion.

Thus, the gap adjuster configured as above enables adjustment of the distance between the lens holder and the rotation support in the first area so as to be a specified distance or more.

The gap adjuster may be arranged in the second area. In this case, the distance between the lens holder and the rotation support in the first area can be adjusted indirectly by the gap adjuster arranged in the second area.

The distance between the first abutment portion and the second abutment portion may decrease as the screwing depth increases. In response to the decrease in the distance between the first abutment portion and the second abutment portion, the distance between the lens holder and the rotation support in the second area decreases, while the distance between the lens holder and the rotation support in the first area increases. Accordingly, the rotation angle of the lens holder relative to the rotation axis may be changed by adjusting the screwing depth.

The male-threaded portion may include a screw shaft having the male thread groove, and a screw head provided at a shaft end of the screw shaft. The screw shaft may include a second shaft end. The screw head may be provided at the second shaft end. The lens holder and the rotation support are held between the screw engaging portion with the female-threaded portion and the screw head in the screw shaft. Thus, the distance between the lens holder and the rotation support in the second area can be limited within a specified range. Accordingly, the gap adjuster configured as above enables adjustment of the distance between the lens holder and the rotation support in the first area so as to be a specified distance or more.

The above-described laser line generator may include an optical axis rotation support rotatably supporting the rotation support relative to the optical axis. The optical axis rotation support enables adjustment of the resting position of the lens holder along a second rotational direction relative to the optical axis.

The optical axis rotation support may include a position determiner. The position determiner may abut the rotation support to thereby restrict rotation of the rotation support. The position determiner may be arranged in the second area. Such optical axis rotation support enables determination of the resting position of the rotation support along the second rotational direction.

The optical axis rotation support can reduce mutual interference between the biasing portion and the position determiner by arranging the position determiner not in the first area, in which the biasing portion is arranged, but in the second area. Accordingly, an increased flexibility can be achieved in arrangement of each of the biasing portion and the position determiner.

The rotation support may include an engagement portion having an engagement surface that intersects a circumferential direction relative to the optical axis. The position determiner may abut the engagement portion directly, or indirectly through an intervening member, to thereby restrict the rotation of the rotation support. By restricting the rotation of the rotation support with the position determiner, the resting position of the rotation support can be determined.

Another aspect of the present disclosure provides a method for adjusting an angle of a conversion lens in a laser line generator. The method includes: bringing a rotation axis into abutment with a lens holder, the lens holder holding the conversion lens, the conversion lens being configured to convert an incident laser beam into a reference laser beam, the reference laser beam diffusing from the conversion lens so as to form a plane, and the rotation axis being perpendicular to an optical axis of the incident laser beam and parallel to the plane; bringing a rotation support into abutment with the rotation axis, the rotation support supporting the lens holder such that the lens holder rotates relative to the rotation axis; bringing a biasing portion into abutment with the lens holder and the rotation support in a first area, the biasing portion being configured to generate a biasing force to bring the lens holder and the rotation support closer to each other, the first area being positioned on an imaginary plane perpendicular to the optical axis, and the imaginary plane being divided into the first area and a second area by the rotation axis; screw-engaging a male-threaded portion with a female-threaded portion in the first area, the female-threaded portion being provided in the lens holder or the rotation support, and the male-threaded portion abutting the lens holder and the rotation support; and/or adjusting a screwing depth of the male-threaded portion relative to the female-threaded portion.

The method can achieve the same effects as those achieved by the above-described laser line generator.

BRIEF DESCRIPTION OF THE DRAWINGS

Some embodiments of the present disclosure will be described hereinafter by way of example with reference to the accompanying drawings, in which.

DETAILED DESCRIPTION OF EXEMPLARY EMBODIMENTS

It is to be understood that the present disclosure is not limited to the embodiments described below, but may be implemented in various forms within the technical scope of the present disclosure.

1. First Embodiment

[1-1. Overall Configuration]

A laser line generator 1 of a first embodiment, which is used at job-sites for civil engineering work, building work, and others.

Figure 1:
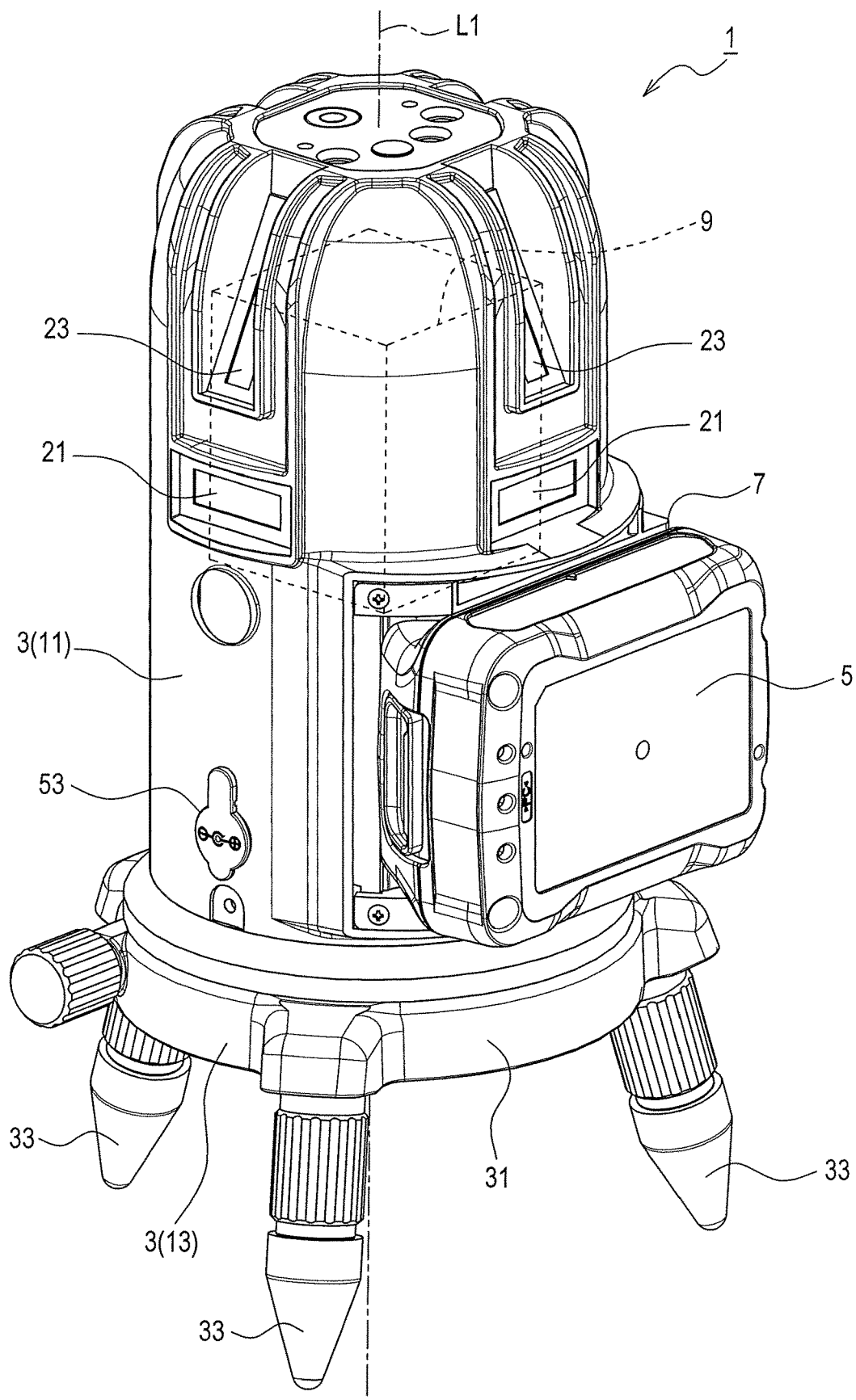
FIG. 1 is a perspective view showing an outer appearance of a laser line generator.

As shown in FIG. 1, the laser line generator 1 includes a housing 3, a battery pack 5, a pack attachment portion 7, and a laser beam generator 9.

The housing 3 includes a base portion 13 and a rotating portion 11. The base portion 13 abuts an installation place of the laser line generator 1. The rotating portion 11 is secured on an upper side of the base portion 13 so as to be rotatable relative to a center axis L1 passing through a center of the rotating portion 11 and extending in a vertical direction.

The rotating portion 11 has a substantially cylindrical shape that extends along the center axis L1. The rotating portion 11 includes an upper part having a dome-shaped periphery. The rotating portion 11 houses therein the laser beam generator 9. The rotating portion 11 includes an outer peripheral wall having four horizontal laser beam passage ports 21 and four vertical laser beam passage ports 23. FIG. 1 shows two of the four horizontal laser beam passage ports 21 and two of the four vertical laser beam passage ports 23.

The laser beam generator 9 generates and emits four horizontal reference laser beams and four vertical reference laser beams. The horizontal reference laser beams each project a horizontal reference line on a target. The vertical reference laser beams each project a vertical reference line on a target. Each of the horizontal laser beam passage ports 21 is configured to allow a corresponding one of the four horizontal reference laser beams to pass through outwardly from inside the housing 3 Specifically, the horizontal laser beam passage ports 21 are provided at approximate intervals of 90° around the center axis L1.

The vertical laser beam passage ports 23 each allow a corresponding one of the four vertical laser beams to pass through outwardly from inside the housing 3. Specifically, similarly to the horizontal laser beam passage ports 21, the vertical laser beam passage ports 23 are provided at approximate intervals of 90° around the center axis L1.

The base portion 13 includes a plate portion 31 and three legs 33. The plate portion 31 is a substantially disk-shaped member to rotatably support the rotating portion 11. The legs 33 extend below from the plate portion 31 and support the plate portion 31.

The pack attachment portion 7 is configured to allow attachment and detachment of the battery pack 5. The battery pack 5 is a rechargeable battery pack. The battery pack 5 includes at least one rechargeable battery cell (not shown) that generates a specified direct voltage and two electrode terminals (not shown) that are electrically connected to the at least one rechargeable battery cell. Upon electrical connection of the battery pack 5 to an external component (for example, the pack attachment portion 7 or a charger (not shown)), charging or discharging is performed between the rechargeable battery cell and the external component. Thus, upon attachment of the battery pack 5 to the pack attachment portion 7, electric power is supplied to the laser beam generator 9 through the electrode terminals.

The laser line generator 1 also includes an operation switch (not shown) and an external power connector 53 (see FIG. 1). The operation switch, which is provided on the outer peripheral wall of the rotating portion 11, is set to an ON-state or an OFF-state by a user's operation. The external power connector 53, which is provided on the outer peripheral wall of the rotating portion 11, is electrically connectable to an external power supply (such as an AC adapter or a DC adapter).

The laser beam generator 9 includes eight laser beam emitters and an emission controller to control these laser beam emitters. Four of the laser beam emitters are provided to emit the horizontal reference laser beams. The four laser beam emitters are arranged correspondingly to the respective horizontal laser beam passage ports 21. The remaining four laser beam emitters, which are provided to emit the vertical reference laser beams, are arranged correspondingly to the respective vertical laser beam passage ports 23.

The laser line generator 1 includes a pendulum (not shown) that is swingably supported to maintain a vertical attitude by a mechanical gimbal mechanism (not shown). The pendulum is set to either a fixed state or a swingable state by a stopper (not shown) configured to operate interlocked with the operation switch (not shown). Each of the laser beam emitters is secured to a specified position of the pendulum, thereby being supported in a swingable manner so as to maintain its vertical attitude. All the laser beam emitters are set to the swingable state upon setting the operation switch to the ON-state by a user, and all the laser beam emitters are set to the fixed state upon setting the operation switch to the OFF-state by the user.

The emission controller operates on electric power supplied from the battery pack 5 or an external power supply. The emission controller controls emission conditions (such as laser luminance and emission direction) of the linear lasers at the laser beam emitters in response to the user's operations. The emission controller may include, for example, a microcomputer. The user may manipulate a not-shown instruction switch to thereby set instructions on emission conditions (such as laser luminance and emission direction) of the laser beams.

[1-2. Laser Beam Emitter]

One of the above-described laser beam emitters is referred to as a laser beam emitter 71, and a description will be given of a configuration of the laser beam emitter 71. The other laser beam emitters each have the same configuration as that of the laser beam emitter 71.

As shown in FIG. 2 to FIG. 12, the laser beam emitter 71 includes the laser beam converter 72, a rotation axis 85, a first rotation support 75, an optical axis rotation support 77, the laser beam source 81, a biasing portion 82, a gap adjuster 84, and a base 87.

Figure 8:
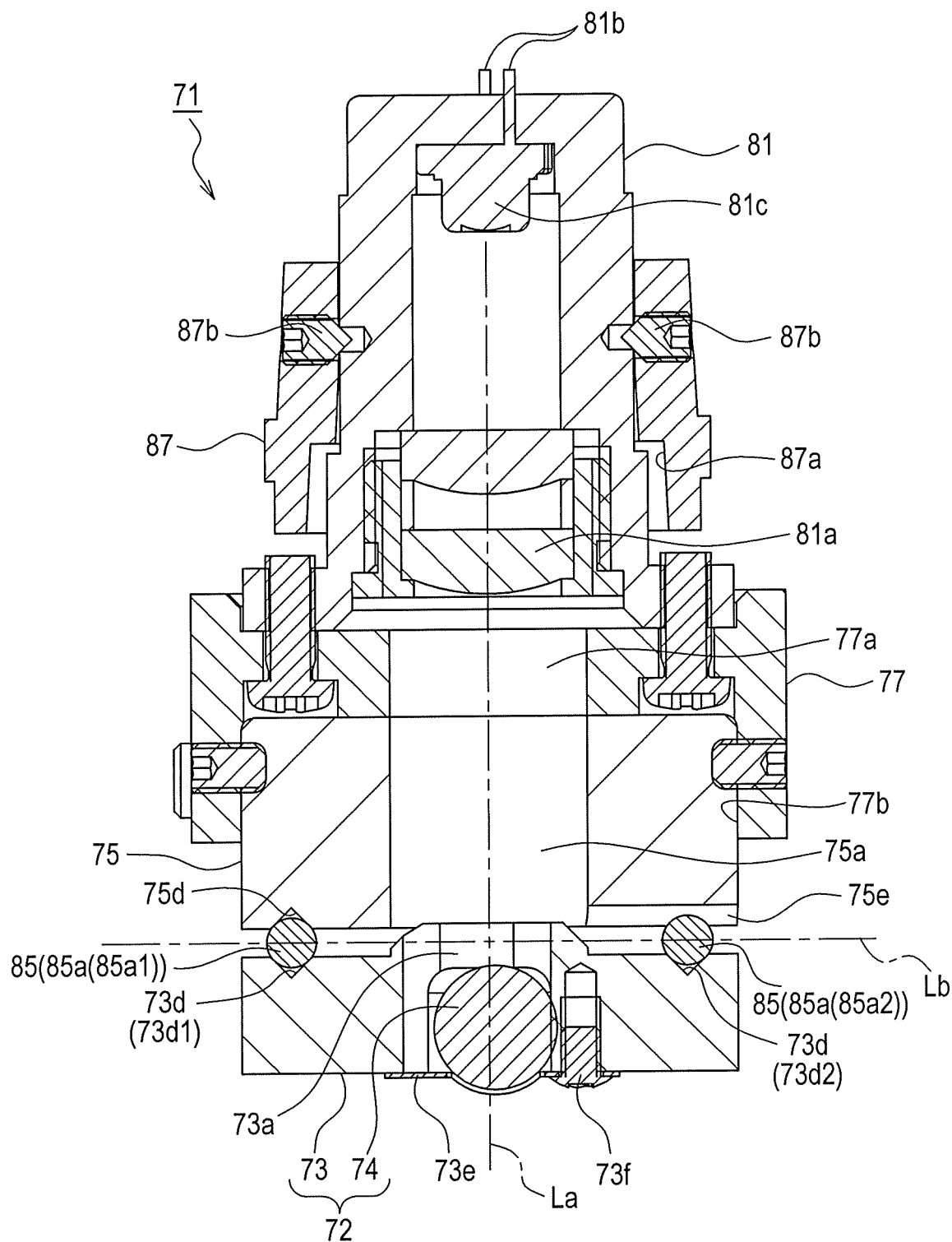
FIG. 8 is a sectional view of the laser beam emitter taken along a line VIII-VIII in FIG. 7.

The laser beam source 81 generates and emits an incident laser beam LS with the electric power supplied from the battery pack 5 or the external power supply. The incident laser beam LS has an optical axis La. More specifically, as shown in FIG. 8, the laser beam source 81 includes a laser emission portion 81a, a terminal portion 81b, and a light emitting part 81c. The laser emission portion 81a emits the incident laser beam LS along the optical axis La. The terminal portion 81b receives electric power necessary for emission operation of the incident laser beam LS. Upon receiving power supply through the terminal portion 81b, the light emitting part 81c outputs a laser beam toward the laser emission portion 81a.

The laser beam converter 72 includes the conversion lens 74 and a first lens holder 73. The conversion lens 74 converts the incident laser beam LS into a reference laser beam LL. The conversion lens 74 includes a cylindrical lens. The cylindrical lens has a cylindrical shape extending along an extension axis. Hereinafter, the conversion lens 74 is also referred to as the cylindrical lens 74. The reference laser beam LL is a beam that travels (or propagates) from the conversion lens 74. The reference laser beam LL diffuses to form a fan-shaped plane LP. More specifically, the reference laser beam LL diffuses in a diffusing direction perpendicular to the optical axis La and perpendicular to the extension axis of the conversion lens 74. Although the incident laser beam LS and the reference laser beam LL are green in color in the present embodiment, the color is not limited to green, but may be any other color such as red. In the laser beam emitter 71, the conversion lens 74 and the laser beam source 81 are arranged such that the optical axis La intersects the conversion lens 74. Thus, when the laser beam source 81 emits the incident laser beam LS, the incident laser beam LS enters the conversion lens 74.

Figure 3:
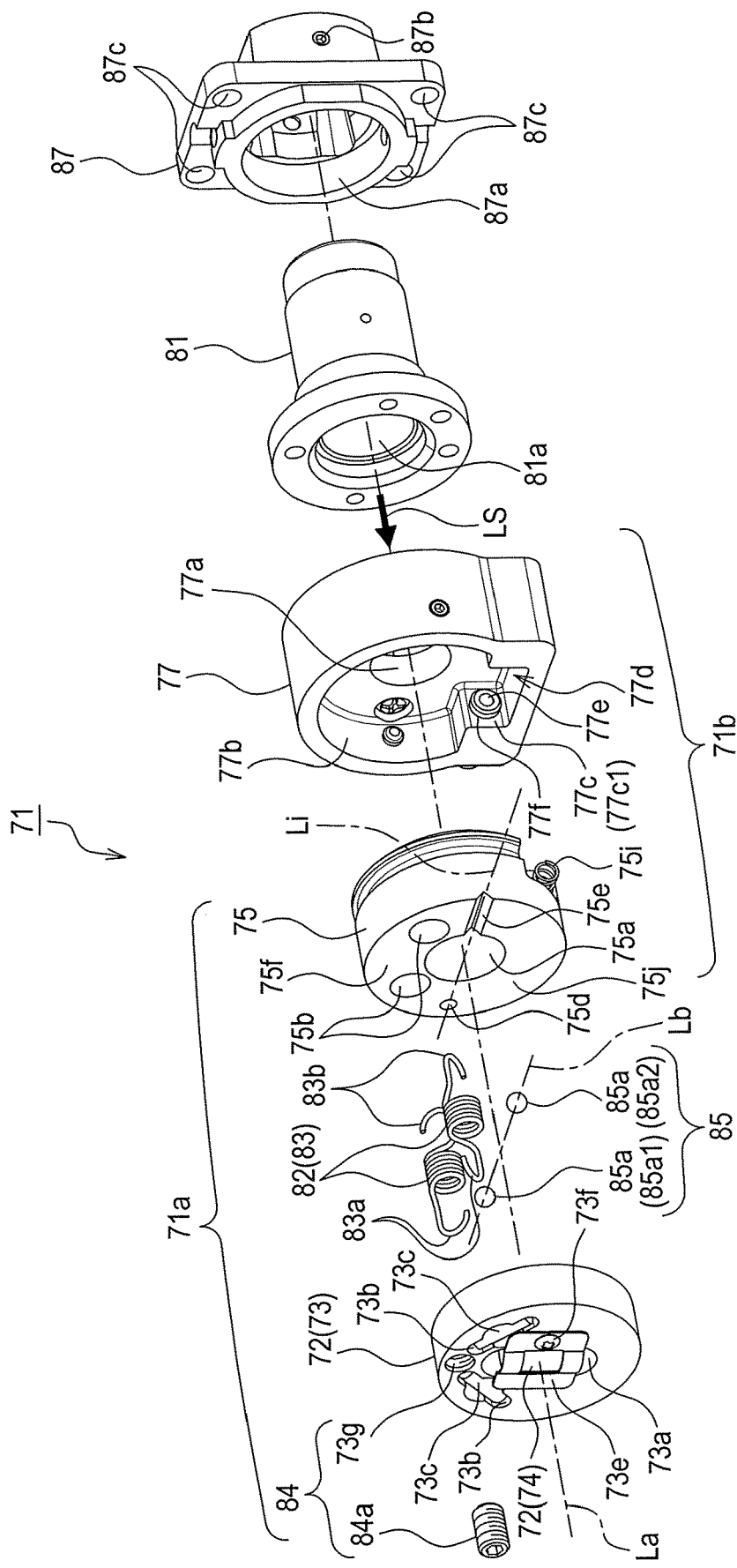
FIG. 3 is an exploded perspective view of the laser beam emitter as seen obliquely from a leading end.
Figure 4:
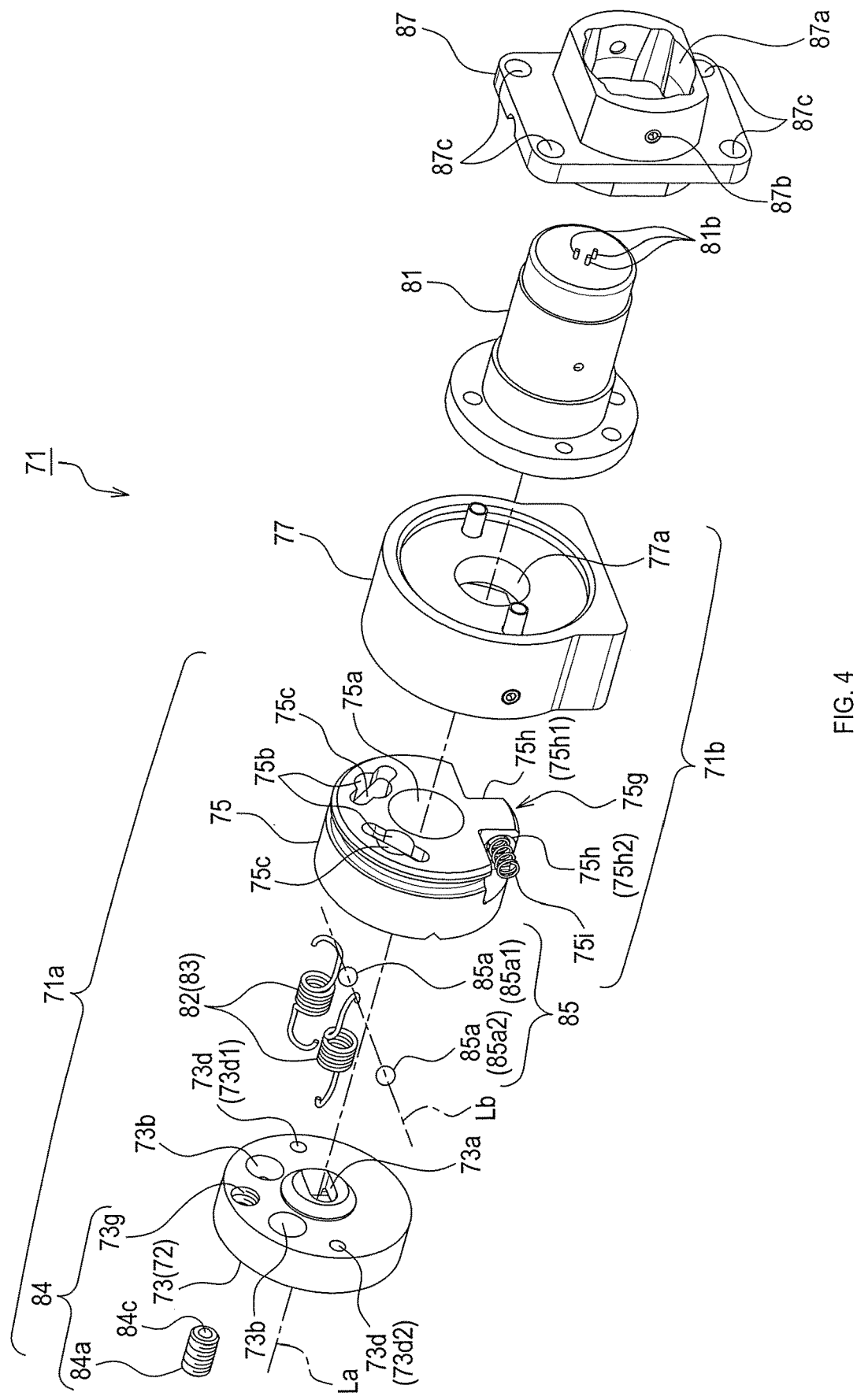
FIG. 4 is an exploded perspective view of the laser beam emitter as seen obliquely from a rear end.

As shown in FIG. 3 and FIG. 4, the base 87 includes an insertion hole 87a allowing insertion of a part of the laser beam source 81. The base 87 is configured to hold (or fix) the laser beam source 81 inserted through the insertion hole 87a with fixing screws 87b (see FIG. 8). The base 87 includes four fixing holes 87c. By securing, for example, fixing bolts (not shown) inserted through the four fixing holes 87c at specified positions of the pendulum, the base 87 is secured to the pendulum, and the laser beam emitter 71 is secured to the pendulum.

One axial end, along the optical axis La, of the laser beam emitter 71 at which the conversion lens 74 is arranged is defined as a leading end, and the other axial end at which the laser beam source 81 is arranged is defined as a rear end.

The laser beam emitter 71 includes a first rotation mechanism 71a to rotate the first lens holder 73 about an angle adjustment rotation axis Lb. The angle adjustment rotation axis Lb is a rotation axis that is perpendicular to the optical axis La and parallel to the plane LP (see FIG. 2). The plane LP is a surface corresponding to a traveling region (or a propagating region) of the reference laser beam LL.

The laser beam emitter 71 also includes a second rotation mechanism 71b to rotate a first rotation support 75 relative to the optical axis La. The laser beam emitter 71 provided with the first rotation mechanism 71a and the second rotation mechanism 71b is configured to enable adjustment of a position of the conversion lens 74 relative to the optical axis La (and an attitude of the conversion lens 74).

[1-3. First Rotation Mechanism]

A description will be given of the first rotation mechanism 71a of the laser beam emitter 71.

As shown in FIGS. 3 and 4, the first rotation mechanism 71a includes the above-described laser beam converter 72 (i.e., the conversion lens 74 and the first lens holder 73), the above-described rotation axis 85, the above-described first rotation support 75, the above-described biasing portion 82, and the above-described gap adjuster 84.

The rotation axis 85 includes two spheres 85a made of metal (for example, iron). The two spheres 85a include a first sphere 85a1 and a second sphere 85a2.

The conversion lens 74 includes a cylindrical lens to convert an incident laser beam LS into a reference laser beam LL. The cylindrical lens has a cylindrical shape. Hereinafter, the conversion lens 74 is also referred to as the cylindrical lens 74.

The first lens holder 73 is a disk-shaped member including a laser passage hole 73a. The first lens holder 73 is configured to hold the conversion lens 74 in a state where the conversion lens 74 is arranged in the laser passage hole 73a, using a securing member 73e and a screw 73f. The first lens holder 73 includes two through holes 73b. Each of the two through holes 73b is configured to allow arrangement of a columnar hook portion 73c within the through hole 73b. The first lens holder 73 includes a female threaded portion 73g penetrating from the leading end to the rear end and including a female thread groove.

The gap adjuster 84 includes a gap adjustment screw 84a and the female threaded portion 73g. The gap adjustment screw 84a is configured to be engageable with the female threaded portion 73g.

As shown in FIG. 4, the first lens holder 73 includes two conical recesses 73d in its surface facing the first rotation support 75. The two conical recesses 73d include a first conical recess 73d1 and a second conical recess 73d2. The first conical recess 73d1 is formed as a conical space to receive a first part of the first sphere 85a1. The second conical recess 73d2 is formed as a conical space to receive a first part of the second sphere 85a2. The first conical recess 73d1 and the second conical recess 73d2 are arranged point-symmetrically to each other about a center of the laser passage hole 73a (in other words, about the optical axis La).

The first sphere 85a1 and the second sphere 85a2 respectively abut the first conical recess 73d1 and the second conical recess 73d2 to thereby function as a rotation axis (the rotation axis 85) of the first lens holder 73. The first sphere 85a1 and the second sphere 85a2 function as the angle adjustment rotation axis Lb.

As shown in FIGS. 3 and 4, the first rotation support 75 is a cylindrical member including a laser passage hole 75a. The first rotation support 75 includes two through holes 75b. Each of the two through holes 75b is configured to allow arrangement of a columnar hook portion 75c within the through hole 75b.

As shown in FIG. 3, the first rotation support 75 includes a third conical recess 75d and a V-groove recess 75e in an opposite surface 75j facing the first lens holder 73. The third conical recess 75d is formed as a conical space to receive a second part of the first sphere 85a1. The third conical recess 75d and the V-groove recess 75e are arranged in the opposite surface 75j so as to be included in an imaginary straight line Li passing through a center of the laser passage hole 75a (in other words, through the optical axis La). The third conical recess 75d and the V-groove recess 75e are provided in different straight line parts of two divided straight line parts defined by dividing the imaginary straight line Li at the center of the laser passage hole 75a (i.e., the optical axis La). The V-groove recess 75e provides a V-sectioned groove space to receive a second part of the second sphere 85a2. The V-groove recess 75e is formed such that the V-sectioned groove space extends along the imaginary straight line Li. The first rotation support 75 includes an abutment portion 75f, which an end 84c of the gap adjustment screw 84a abuts.

The first rotation support 75 is configured to abut the rotation axis 85 (specifically, the two spheres 85a) and support the first lens holder 73 through the rotation axis 85 such that the first lens holder 73 rotates relative to the angle adjustment rotation axis Lb.

As described above, the laser beam emitter 71 is configured such that the first sphere 85a1 and the second sphere 85a2 are positioned at two sphere abutment portions (the third conical recess 75d and the V-groove recess 75e) of the first rotation support 75. The laser beam emitter 71 is configured such that the first lens holder 73 rotates relative to the first sphere 85a1 and the second sphere 85a2. Thus, it is possible to adjust a resting position of the first lens holder 73 along a first rotational direction R1 (see FIG. 2) relative to the angle adjustment rotation axis Lb (the axis passing through the two sphere 85a), and is also possible to adjust the position and attitude of the conversion lens 74.

Figure 7:
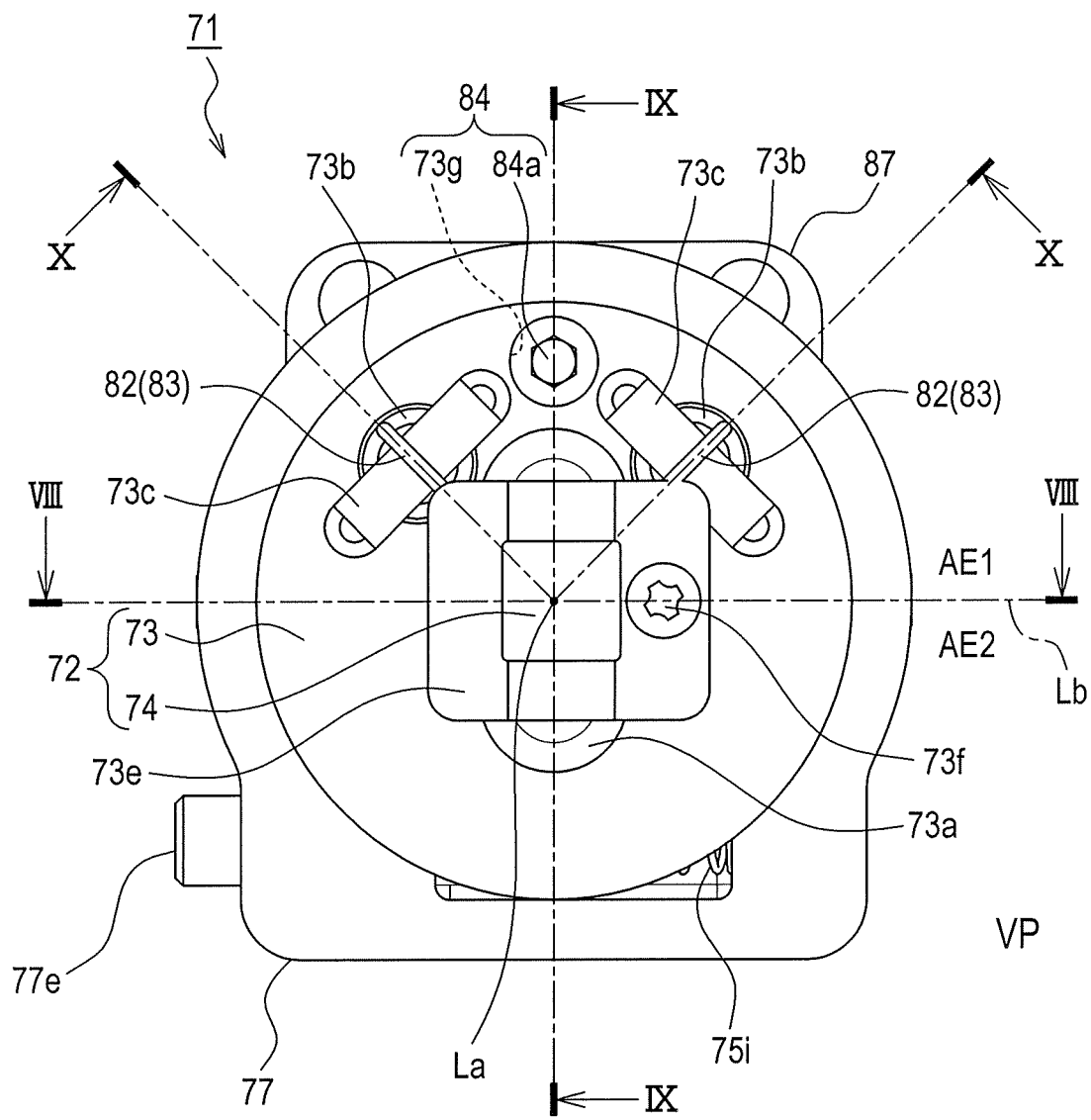
FIG. 7 is a plan view showing an outer appearance of the leading end of the laser beam emitter.

As shown in FIG. 7, assuming that the laser beam emitter 71 includes two areas, defined as a first area AE1 and a second area AE2, which are divided by the angle adjustment rotation axis Lb on an imaginary plane VP (for example, a paper surface of FIG. 7) perpendicular to the optical axis La. The first lens holder 73 has the two through holes 73b and the female threaded portion 73g in one of the first area AE1 and the second area AE2 (the first area AE1 in the present embodiment). The first rotation support 75 has the two through holes 75b and the abutment portion 75f (see FIG. 3) in the first area AE1 or the second area AE2 (the first area AE1 in the present embodiment).

Figure 10:
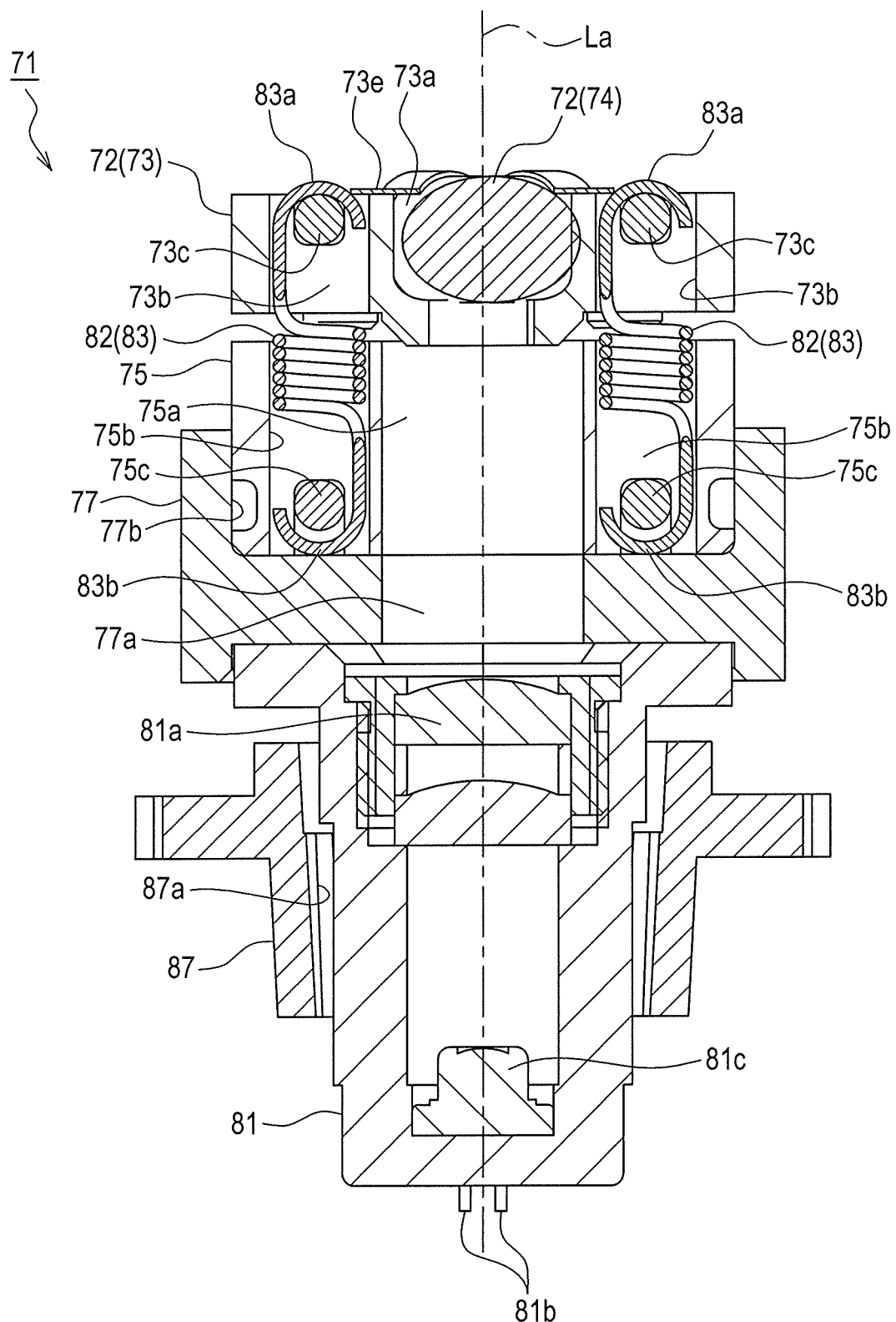
FIG. 10 is a sectional view of the laser beam emitter taken along a line X-X in FIG. 7.
Figure 11:
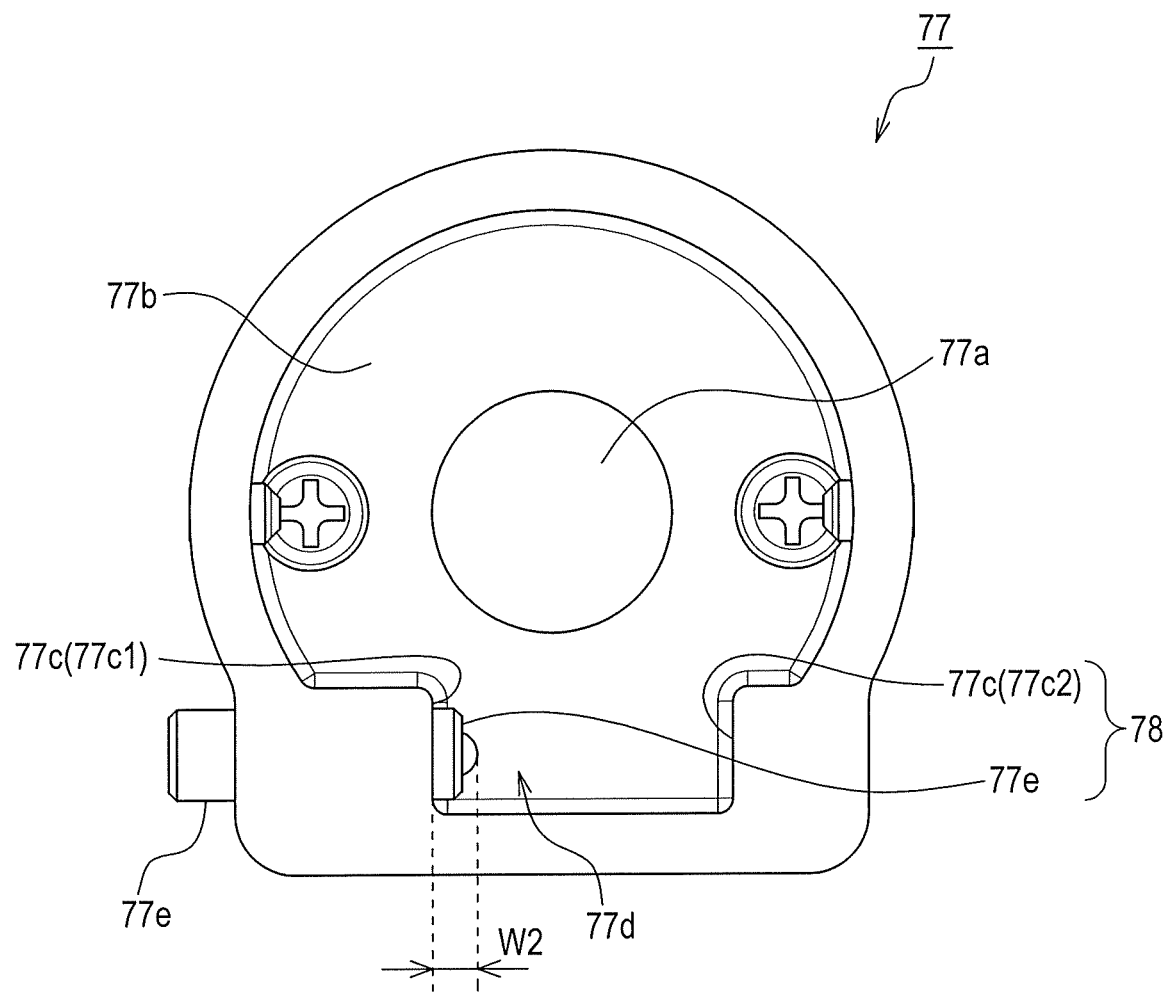
FIG. 11 is an explanatory diagram showing a protruding dimension W2 of a position adjustment screw from a first facing engagement surface in the optical axis rotation support.

As shown in FIGS. 3 and 4, and FIG. 10, the biasing portion 82 includes two springs 83. Each of the springs 83 is a coil spring having a first fixing end 83a and a second fixing end 83b. Each of the first fixing ends 83a is hooked to the corresponding hook portion 73c, and each of the second fixing ends 83b is hooked to the corresponding hook portion 75c. In other words, these springs 83 abut the first lens holder 73 and the first rotation support 75 in the first area AE1, and generate biasing forces to bring the first lens holder 73 and the first rotation support 75 closer to each other. As a result, the first lens holder 73 and the first rotation support 75 in the first area AE1 are in a state of approaching each other due to elastic forces (biasing forces) of these springs 83.

Due to the two springs 83, the biasing portion 82 abuts two points of the first lens holder 73 and also abut two points of the first rotation support 75 in the first area AE1. Thus, the biasing portion 82 provides a greater force to reduce a distance between the first lens holder 73 and the first rotation support 75, as compared with a case of having a single spring (in other words, a case of abutting a single portion of the first lens holder 73 and a single portion of the first rotation support 75).

Figure 9:
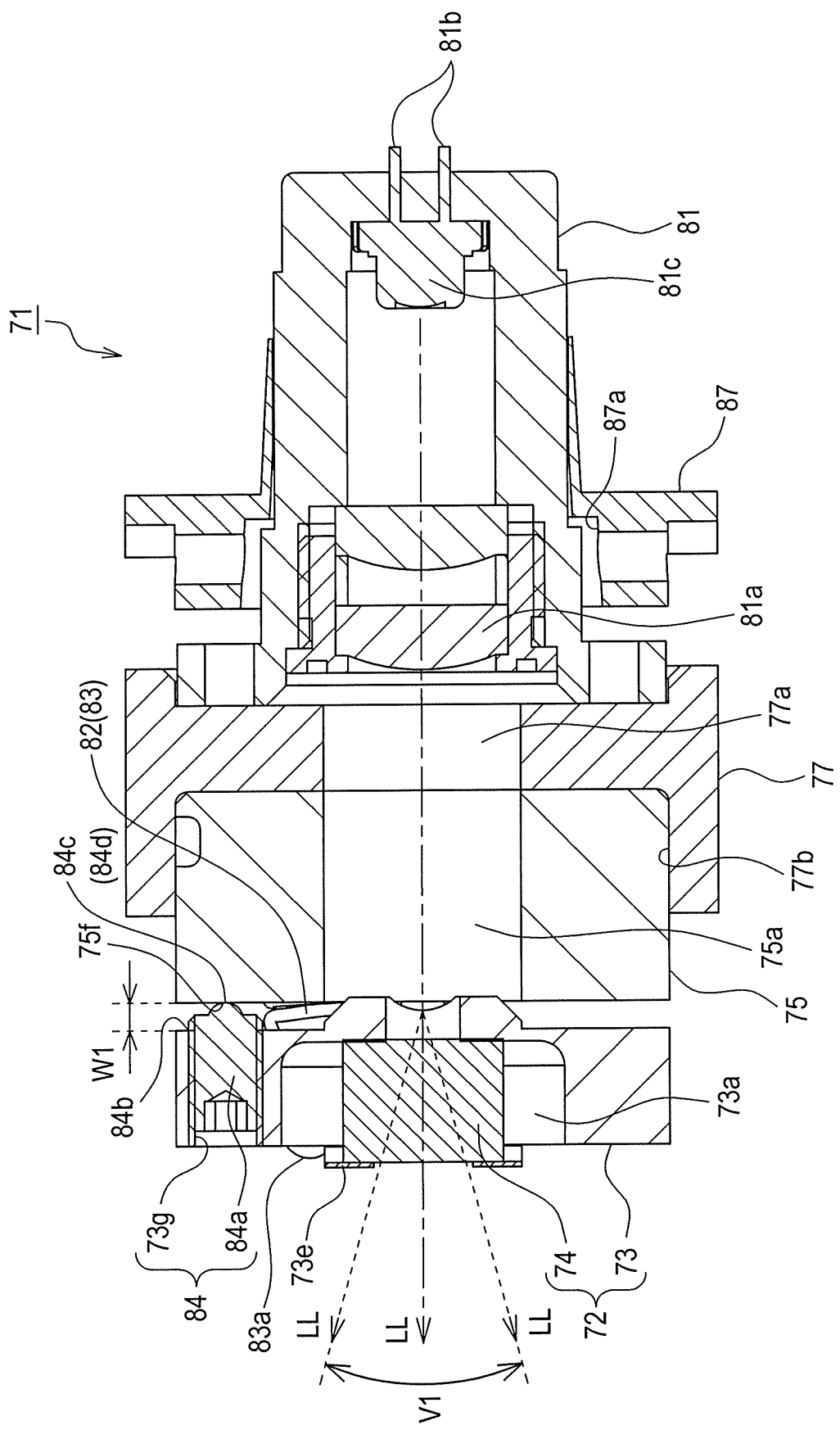
FIG. 9 is a sectional view of the laser beam emitter taken along a line IX-IX in FIG. 7.

As shown in FIGS. 3, 4, and 9, the gap adjustment screw 84a includes a male screw. Specifically, the gap adjustment screw 84a is a hexagon socket set screw (a hollow set screw, a set screw). The gap adjustment screw 84a is screwed relative to the female-threaded portion 73g in a state of protruding from the first lens holder 73 toward the first rotation support 75. The end 84c of the gap adjustment screw 84a protrudes from the female threaded portion 73g and abuts the abutment portion 75f of the first rotation support 75. That is, the gap adjustment screw 84a is configured to abut the first lens holder 73 and the first rotation support 75, and to be engaged with the female threaded portion 73g.

The gap adjuster 84 is configured such that the end 84c of the gap adjustment screw 84a abuts the abutment portion 75f to thereby restrict a gap dimension W1 (see FIG. 9) between the first lens holder 73 and the first rotation support 75 in the first area AE1 to a specified distance or more. That is, the gap adjuster 84 is configured to adjust the gap dimension W1 between the first lens holder 73 and the first rotation support 75 that are brought closer to each other by the biasing portion 82.

As shown in FIG. 9, the gap adjuster 84 is configured to change a distance (corresponding to the gap dimension W1, hereinafter also referred to as a "distance W 1") between a first abutment portion 84b and a second abutment portion 84d of the gap adjustment screw 84a as a screwing depth of the gap adjustment screw 84a relative to the female-threaded portion 73g changes. The gap adjuster 84 is configured such that the distance W1 increases as the screwing depth increases. The first abutment portion 84b of the gap adjustment screw 84a is a portion to abut the first lens holder 73 (more specifically, the female threaded portion 73g). The second abutment portion 84d of the gap adjustment screw 84a is a portion (the end 84c) to abut the first rotation support 75 (more specifically, the abutment portion 75f). In other words, the gap adjuster 84 is configured such that the distance W1 decreases due to elastic forces of the springs 83 as the screwing depth of the gap adjustment screw 84a relative to the female-threaded portion 73g decreases.

Figure 2:
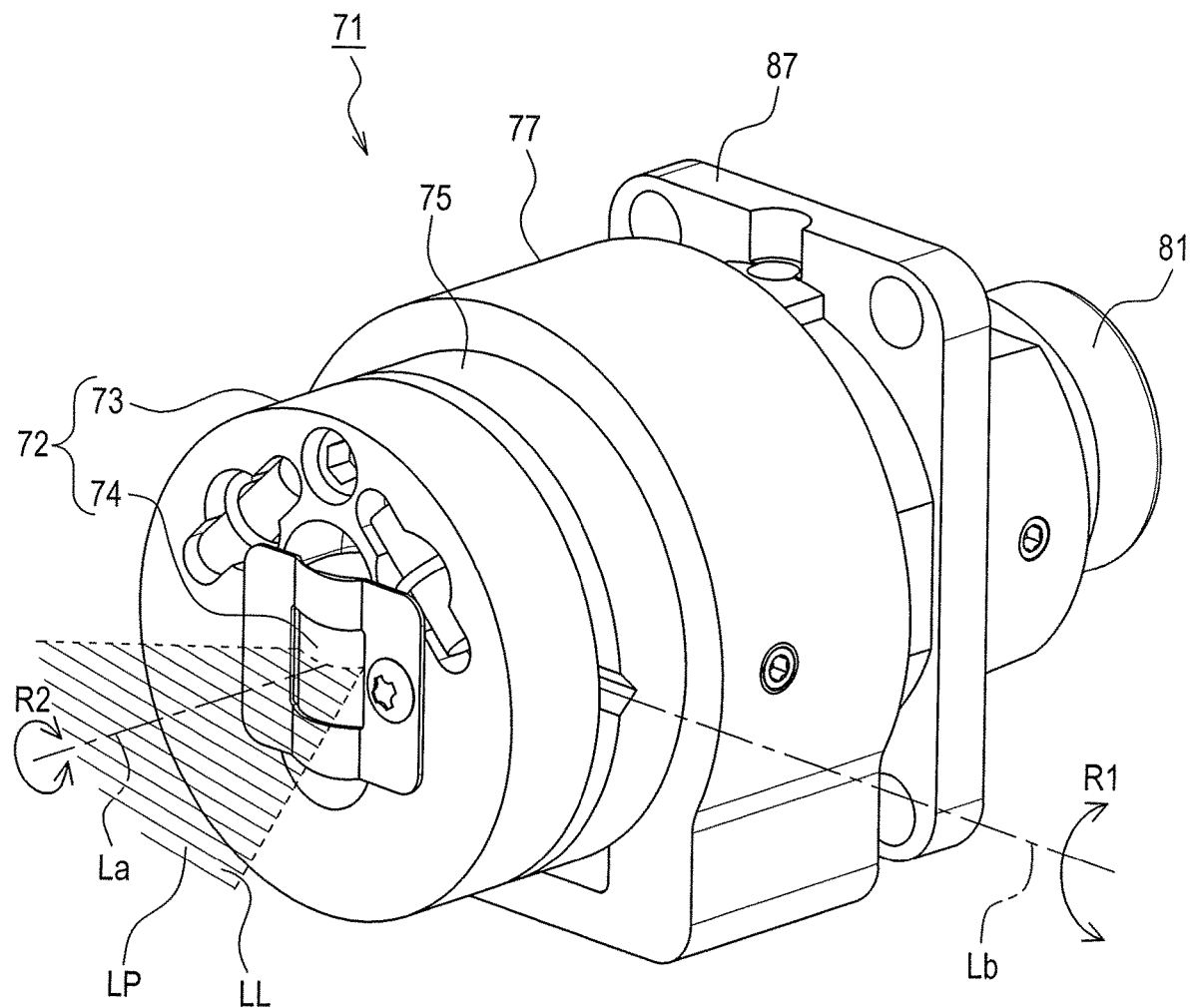
FIG. 2 is a perspective view showing an outer appearance of a laser beam emitter.

By changing the distance W1 using the gap adjuster 84 (the gap adjustment screw 84a and the female threaded portion 73g), it is possible to change the resting position (a rotational position) of the first lens holder 73 along the first rotational direction R1 (see FIG. 2). The laser beam emitter 71 can change the resting position of the conversion lens 74 using the gap adjuster 84, and also can adjust the position and the attitude of the conversion lens 74 relative to the optical axis La.

Accordingly, the laser beam emitter 71 changes the distance W1 using the gap adjuster 84 to allow an emission direction of the reference laser beam LL in the laser beam emitter 71 to be closer to an ideal emission direction (a target emission direction) within a first adjustable range V1 shown in FIG. 9.

[1-4. Second Rotation Mechanism]

A description will be given of the second rotation mechanism 71b of the laser beam emitter 71.

As shown in FIGS. 3 and 4, the second rotation mechanism 71b includes the first rotation support 75 and the optical axis rotation support 77.

Figure 5:
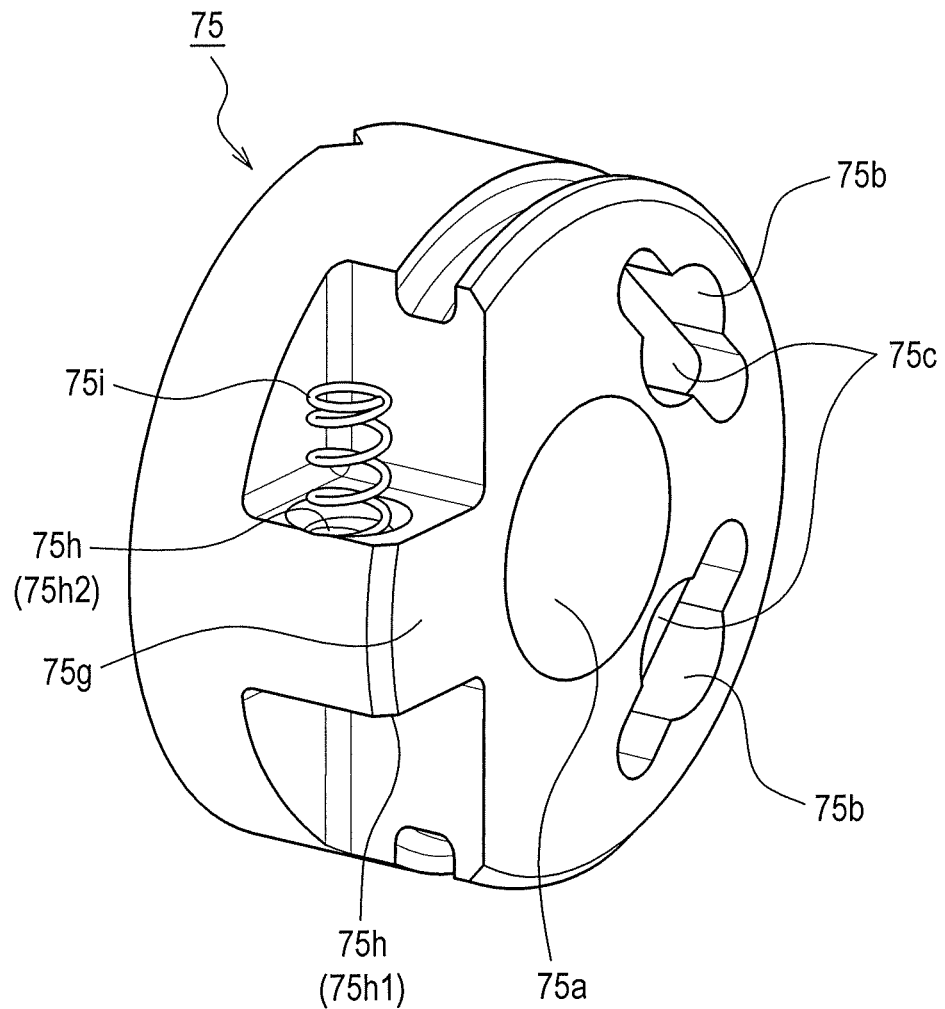
FIG. 5 is a perspective view of a rotation support as seen obliquely from the rear end.

As shown in FIGS. 4 and 5, the first rotation support 75 includes an engagement portion 75g. The engagement portion 75g faces the optical axis rotation support 77. The engagement portion 75g includes two engagement surfaces 75h (a first engagement surface 75h1 and a second engagement surface 75h2) that intersect a circumferential direction relative to the optical axis La. Here, "a surface intersecting the circumferential direction relative to the optical axis La" may be also defined as "a surface intersecting an imaginary circle about the optical axis La as a center axis" or as "a surface including portions having different distances from the optical axis La". In contrast, an example of "a surface not intersecting the circumferential direction about the optical axis La" may be "a cylindrical lateral surface of the first rotation support 75".

Figure 6:
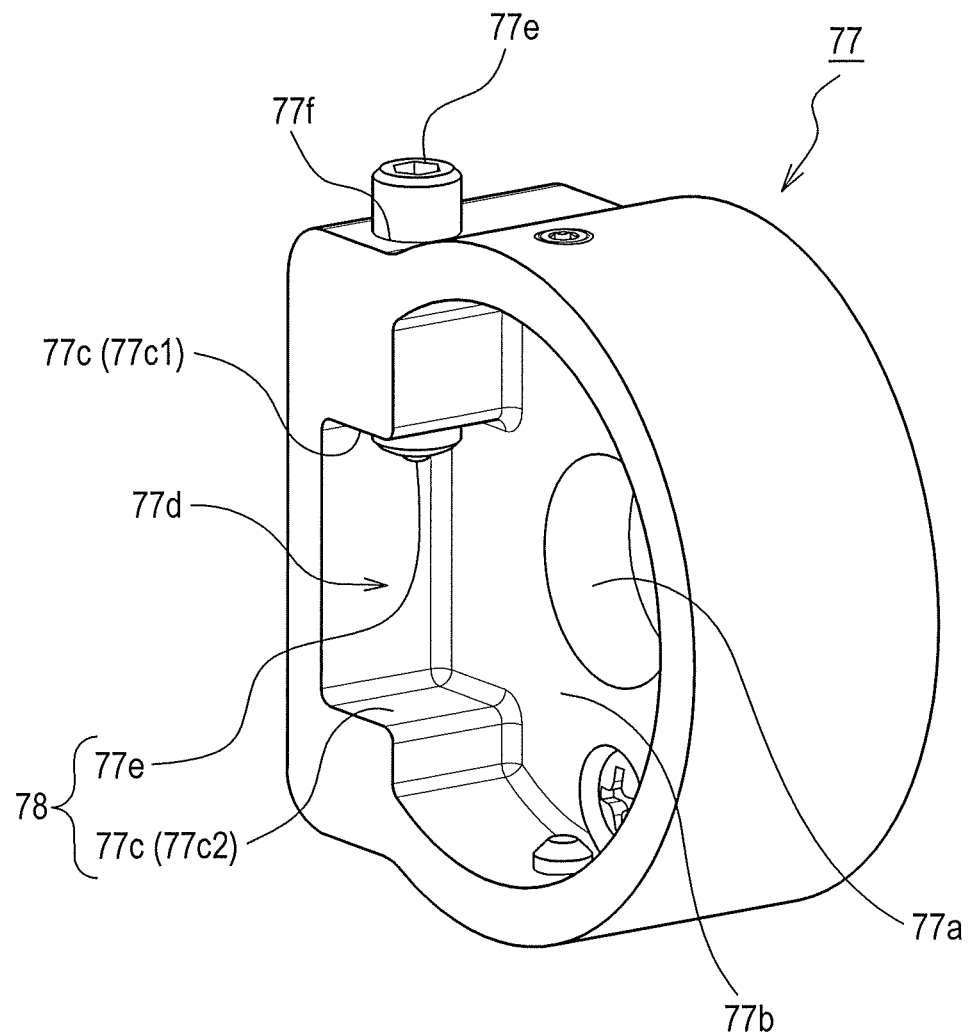
FIG. 6 is a perspective view of an optical axis rotation support as seen obliquely from the leading end.

As shown in FIGS. 3, 4, and 6, the optical axis rotation support 77 is a cylindrical member including a laser passage hole 77a. The optical axis rotation support 77 includes an internal space 77b to contain a part of the first rotation support 75. The optical axis rotation support 77 is configured to support the first rotation support 75 in a rotational manner about the optical axis La. The optical axis rotation support 77 includes an engagement portion arrangement space 77d in the internal space 77b, and the engagement portion 75g is arranged in the engagement portion arrangement space 77d. The engagement portion arrangement space 77d includes two facing engagement surfaces 77c (a first facing engagement surface 77c1 and a second facing engagement surface 77c2) that face the two respective engagement surfaces 75h.

The optical axis rotation support 77 includes a screw hole 77f in the first facing engagement surface 77c1. The screw hole 77f is a female screw hole penetrating from outside the optical axis rotation support 77 to the internal space 77b (the first facing engagement surface 77c1). The optical axis rotation support 77 includes a position adjustment screw 77e configured to be engaged in the screw hole 77f. The position adjustment screw 77e is a hexagon socket set screw (a hollow set screw, a set screw). The position adjustment screw 77e is engaged in the screw hole 77f in a state of protruding from the first facing engagement surface 77c1 toward the second facing engagement surface 77c2.

The first rotation support 75 is supported by the optical axis rotation support 77 in a state where at least a part of the first rotation support 75 (for example, the engagement portion 75g) is arranged in the internal space 77b. In this state, the first engagement surface 75h1 of the first rotation support 75 abuts the position adjustment screw 77e protruding from the first facing engagement surface 77c1, and the second engagement surface 75h2 faces the second facing engagement surface 77c2 through a positioning spring 75i. Specifically, the engagement portion 75g is held between the position adjustment screw 77e and the second facing engagement surface 77c2 through the positioning spring 75i, and thereby a resting position of the engagement portion 75g in the engagement portion arrangement space 77d is determined. The resting position of the engagement portion 75g in the engagement portion arrangement space 77d may be changed by changing a protruding dimension W2 (see FIG. 11) of the position adjustment screw 77e from the first facing engagement surface 77c1.

As described above, the optical axis rotation support 77 may change the resting position of the engagement portion 75g in the engagement portion arrangement space 77d using the position adjustment screw 77e, thereby allowing changes in the resting position (rotational position) of the first rotation support 75 along a second rotational direction R2 (see FIG. 2) relative to the optical axis La. That is, by using the second rotation mechanism 71b, the laser beam emitter 71 can adjust the resting position (or the rotational position) of the first rotation support 75 along the second rotational direction R2, and also can adjust the position of the conversion lens 74 and the attitude of the conversion lens 74 along the second rotational direction R2.

Thus, the laser beam emitter 71 may change the protruding dimension W2 using the position adjustment screw 77e to adjust the position of the conversion lens 74 and the attitude of the conversion lens 74 along the second rotational direction R2, thereby allowing changes in a rotation angle or a tilt of the reference laser beam LL along the second rotational direction R2 (or an orientation of the reference laser beam LL, or a diffusion width direction of the reference laser beam LL). That is, by adjusting the protruding dimension W2, the laser beam emitter 71 can make the rotation angle of the reference laser beam LL closer to an ideal rotation angle (or a target rotation angle). Accordingly, it is possible to make a rotation angle (or an orientation, or a tilt) of the aforementioned horizontal reference line or the aforementioned vertical reference line projected on the target closer to an ideal rotation angle.

[1-5. Effects]

As described above, the laser line generator 1 of the present embodiment enables adjustment of a relative position of the conversion lens 74 with respect to the optical axis La of the incident laser beam LS with a simple configuration in which the gap dimension W1 between the first lens holder 73 and the first rotation support 75 is adjusted using the gap adjustment screw 84a. As a result, the laser line generator 1 enables adjustment of a traveling direction of the reference laser beam LL along the first rotational direction R1 by adjustment of the gap dimension W1 using the gap adjustment screw 84a.

Accordingly, the laser line generator 1 with such a simple configuration simplifies an adjustment operation of a lens angle of the conversion lens 74, and thus enables reduction in workload of a user. Also, the laser line generator 1 with such a simple configuration leads to less deformation of constituent components, and thus enables proper adjustment of the lens angle and proper adjustment of the traveling direction of the reference laser beam LL.

In the laser line generator 1, the first lens holder 73 includes the two conical recesses 73d (a first conical recess 73d1, a second conical recess 73d2), and the first rotation support 75 includes the third conical recess 75d and the V-groove recess 75e.

In the laser line generator 1, the first sphere 85a1 is positioned by the first conical recess 73d1 and the third conical recess 75d, and the second sphere 85a2 is positioned by the second conical recess 73d2 and the V-groove recess 75e. In this case, an abutment position of the V-groove recess 75e with the second sphere 85a2 is changeable along an extending direction of the V-groove. Thus, if machining errors (manufacturing errors) occur between formed positions of the two conical recesses 73d in the first lens holder 73 and formed positions of the third conical recess 75d and the V-groove recess 75e in the first rotation support 75, the abutment position of the V-groove recess 75e with the second sphere 85a2 can be changed to a proper position.

Accordingly, the laser line generator 1 achieves proper positioning of the two spheres 85a between the first lens holder 73 and the first rotation support 75.

Figure 12:
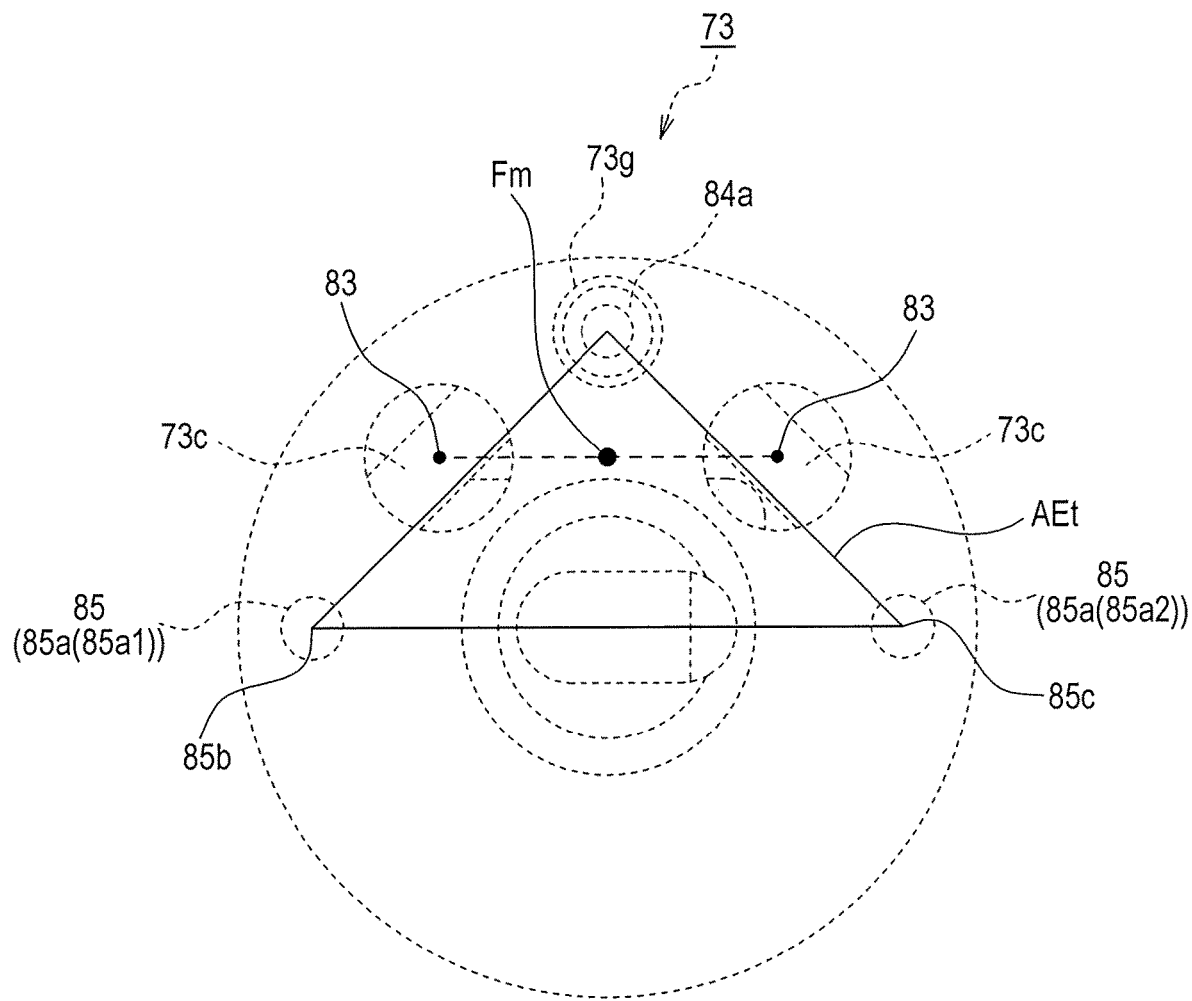
FIG. 12 is an explanatory diagram showing an imaginary triangle area AEt in a lens holder.

In the laser line generator 1, as shown in FIG. 12, an action center position Fm of a biasing force applied by the biasing portion 82 (the two springs 83) in the first lens holder 73 is located within an imaginary triangle area AEt. Respective apexes of the imaginary triangle area AEt correspond to the first sphere 85a1, the second sphere 85a2, and the female threaded portion 73g.

The laser line generator 1 with such configuration can inhibit a biasing force by the biasing portion 82 from acting unequally on the first lens holder 73, thereby inhibiting the first lens holder 73 from being tilted in an improper direction and inhibiting the conversion lens 74 from being positioned improperly.

The first sphere 85a1 and the second sphere 85a2 function as both ends (i.e., the first end 85b and the second end 85c) of the rotation axis 85 along an extending direction of the angle adjustment rotation axis Lb. That is, the first sphere 85a1 and the second sphere 85a2 correspond respectively to the first end 85b and the second end 85c of the rotation axis 85. The female threaded portion 73g corresponds to an abutment portion between the first lens holder 73 and the gap adjuster 84 (i.e., the gap adjustment screw 84a). The imaginary triangle area AEt is formed by connecting three points, i.e., a center of the first end 85b, a center of the second end 85c, and a center of the female threaded portion 73g.

The action center position Fm of the biasing force in the present embodiment corresponds to a middle point between two abutment portions of the first lens holder 73 with the two springs 83. The action center position Fm corresponds to a position, in the first lens holder 73, on which a resultant biasing force composed of biasing forces by the two springs 83 acts.

In a case where the first lens holder 73 includes three abutment portions with the biasing portion 82, a central position having an equal distance from the three abutment portions is defined as the action center position Fm of the biasing force. Further, in a case where respective biasing forces acting on multiple abutment portions are different from one another (for example, in a case where multiple springs 83 have different elastic forces (or spring constants)), a position that is closer, from the middle point, to the abutment portion receiving a larger biasing force is defined as the action center position Fm of the biasing force depending on levels of the respective biasing forces.

In the laser line generator 1, the optical axis rotation support 77 includes the position adjustment screw 77e and the second facing engagement surface 77c2 to determine the resting position of the first rotation support 75 along the second rotational direction R2 relative to the optical axis La. The position adjustment screw 77e and the second facing engagement surface 77c2 function as a position determiner 78 to determine the resting position of the first rotation support 75. Specifically, the position determiner 78 is configured to abut the first rotation support 75 through the positioning spring 75i and restrict rotation of the first rotation support 75, to thereby determine the resting position of the first rotation support 75 along the rotational direction relative to the optical axis La of the incident laser beam LS.

The position determiner 78 (i.e., the position adjustment screw 77e and the second facing engagement surface 77c2) is arranged in the second area AE2 of the optical axis rotation support 77. By arranging the position determiner 78 not in the first area AE1 where the biasing portion 82 is located but in the second area AE2, the optical axis rotation support 77 can reduce interference between the biasing portion 82 and the position determiner 78. Accordingly, the laser line generator 1 can achieve an increased flexibility in arrangement of both the biasing portion 82 and the position determiner 78.

[1-6. Correspondence of Terms]

A description will now be given of correspondence of terms.

The spring 83 corresponds to one example of a biasing portion of the present disclosure, the first conical recess 73d1, the second conical recess 73d2, the third conical recess 75e, and the V-groove recess 75e correspond to one example of a sphere abutment portion of the present disclosure, and the V-groove recess 75e corresponds to one example of a V-groove recess of the present disclosure.

The angle adjustment rotation axis Lb corresponds to one example of a rotation axis of the present disclosure.

2. Second Embodiment

A description will be given, as a second embodiment, of a laser line generator that includes a second laser beam emitter 171 provided with a gap adjuster in the second area AE2.

The laser line generator of the second embodiment is different from the laser line generator 1 of the first embodiment in that the laser beam emitter 71 is replaced with the second laser beam emitter 171. Thus, the second laser beam emitter 171 will be mainly described below. The same components in the second embodiment as those in the first embodiment are assigned the same respective reference numerals.

Figure 13:
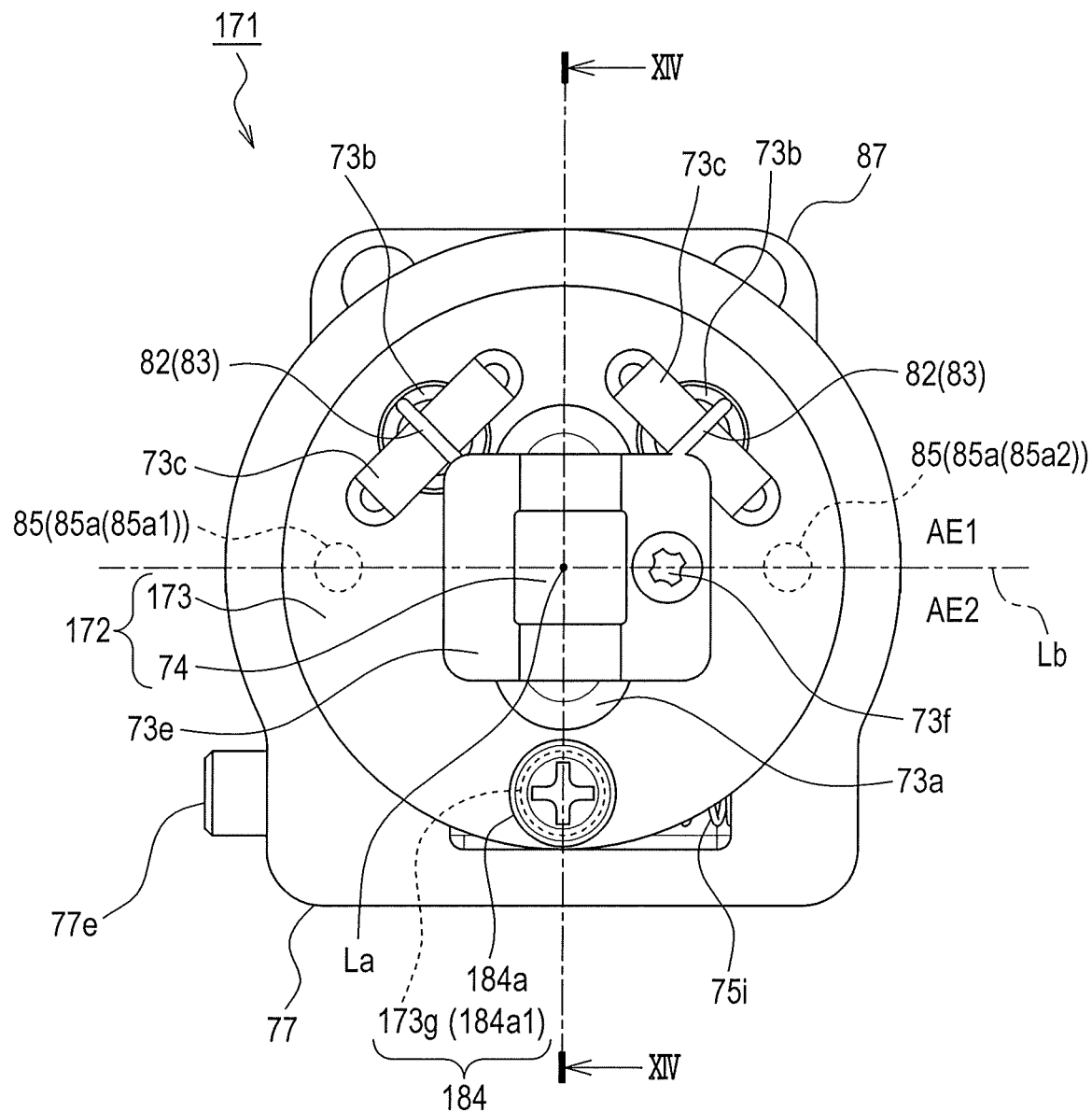
FIG. 13 is a plan view showing an outer appearance of a leading end of a second laser beam emitter of a second embodiment.
Figure 14:
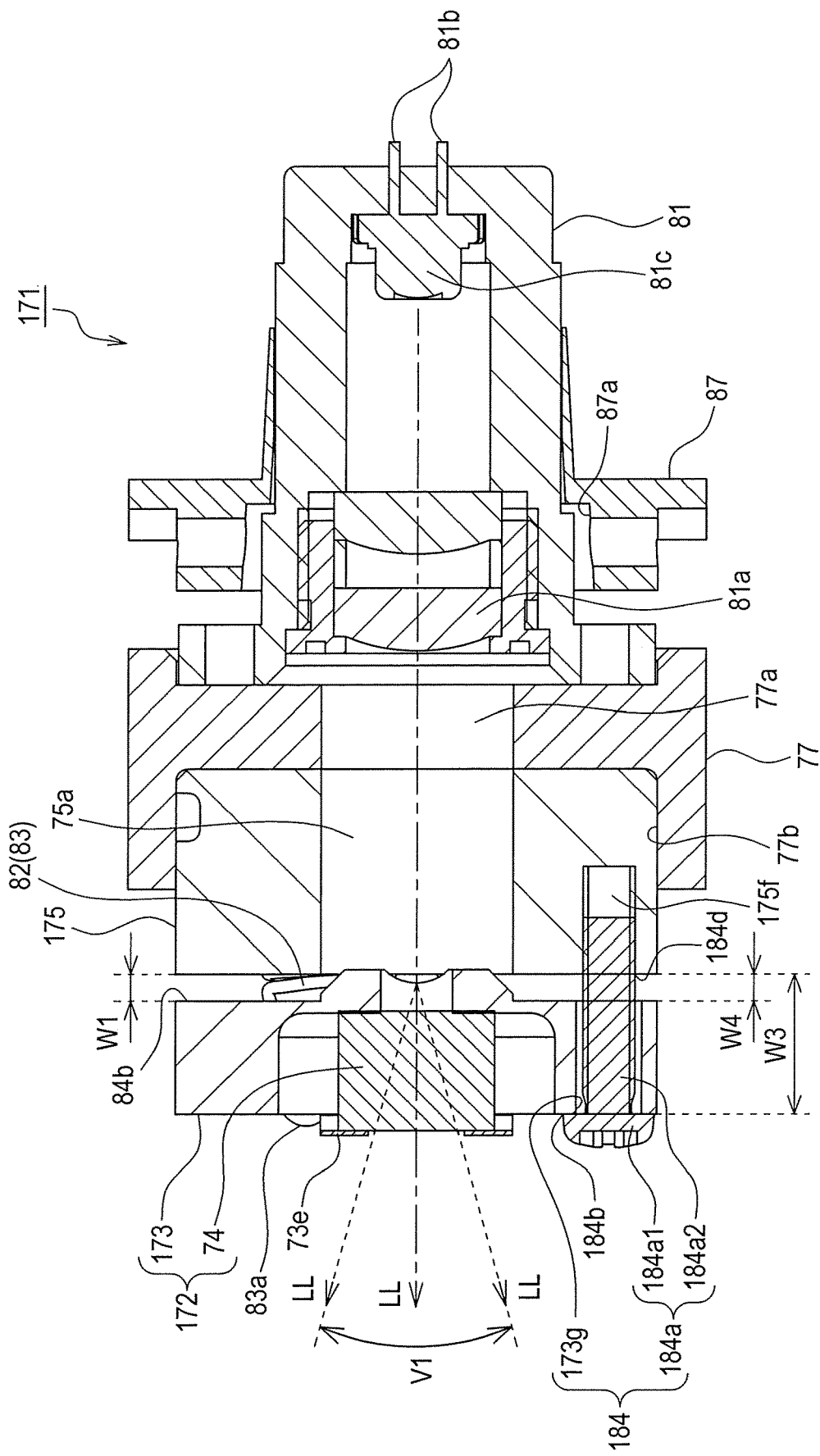
FIG. 14 is a sectional view of the second laser beam emitter taken along a line XIV-XIV in FIG. 13.

As shown in FIGS. 13 and 14, the second laser beam emitter 171 includes a second laser beam converter 172, the rotation axis 85 (i.e., the two spheres 85a), a second rotation support 175, the optical axis rotation support 77, the laser beam source 81, the biasing portion 82, a second gap adjuster 184, and the base 87. The second laser beam converter 172 includes the conversion lens 74 (or the cylindrical lens 74) and a second lens holder 173.

The second lens holder 173 corresponds to a configuration in which the female threaded portion 73g is removed from the first lens holder 73 of the first embodiment, and a through hole 173g is added to the first lens holder 73. The through hole 173g is formed in the second area AE2.

The second rotation support 175 corresponds to a configuration in which a second female threaded portion 175f is added to the first rotation support 75 of the first embodiment. The second female threaded portion 175f is formed in the second area AE2 of the second rotation support 175 and includes an open leading end with a female thread groove.

The second gap adjuster 184 includes a second gap adjustment screw 184a, the through hole 173g, and the second female threaded portion 175f. The second gap adjustment screw 184a includes a screw head 184a1 and a screw shaft 184a2. The screw head 184a1 has a larger diameter than the through hole 173g and is engageable with a leading end surface of the second lens holder 173. The screw shaft 184a2 has a smaller diameter than the through hole 173g and includes a male screw that is engageable with the second female threaded portion 175f.

The second rotation support 175 is configured to abut the rotation axis 85 (more specifically, the two spheres 85a), and to support the second lens holder 173 through the rotation axis 85 such that the second lens holder 173 rotates about the angle adjustment rotation axis Lb.

As described above, the second laser beam emitter 171 is configured such that the two spheres 85a are positioned at the two sphere abutment portions (i.e., the third conical recess 75d and the V-groove recess 75e) of the second rotation support 175, and the second lens holder 173 rotates about the two spheres 85a. This enables adjustment of the resting position of the second lens holder 173 along the first rotational direction R1 (see FIG. 2) relative to the angle adjustment rotation axis Lb (i.e., the axis passing through the two spheres 85a), and enables adjustment of the position of the conversion lens 74 and the attitude of the conversion lens 74.

The second gap adjustment screw 184a is inserted into the through hole 173g and is screw-engaged with the second female threaded portion 175f in a state of protruding from the second lens holder 173 toward the second rotation support 175. The second gap adjustment screw 184a is provided in the second area AE2 such that a rear end (i.e., a first abutment portion 184b) of the screw head 184a1 abuts the second lens holder 173, and such that a screw engaging portion (i.e., a second abutment portion 184d) of the screw shaft 184a2 with the second female threaded portion 175f abuts the second rotation support 175. In other words, the second gap adjustment screw 184a is configured to hold the second lens holder 173 and the second rotation support 175 between the second abutment portion 184d, which is screw-engaged with the second female threaded portion 175f, of the screw shaft 184a2 and the first abutment portion 184b of the screw head 184a1.

The second gap adjuster 184 can limit a distance between the second lens holder 173 and the second rotation support 175 in the second area AE2 within a specified range by holding the second lens holder 173 and the second rotation support 175 with the second gap adjustment screw 184a. Thus, the second gap adjuster 184 can adjust the distance between the second lens holder 173 and the second rotation support 175 in the first area AE1 so as to be a specified distance or more. This enables the second gap adjuster 184 to adjust a rotation angle of the second lens holder 173.

Specifically, as shown in FIG. 14, the second gap adjuster 184 is configured such that a distance W3 between the first abutment portion 184b and the second abutment portion 184d of the second gap adjustment screw 184a changes as a screwing depth of the second gap adjustment screw 184a relative to the second female threaded portion 175f changes. The second gap adjuster 184 is configured such that the distance W3 decreases as the screwing depth of the second gap adjustment screw 184a increases. As the distance W3 decreases, a distance W4 between the second lens holder 173 and the second rotation support 175 in the second area AE2 decreases, and the distance W1 between the second lens holder 173 and the second rotation support 175 in the first area AE1 increases. This enables changes in the rotation angle of the second lens holder 173 relative to the angle adjustment rotation axis Lb. In other words, the second gap adjuster 184 is configured such that as the screwing depth of the second gap adjustment screw 184a relative to the second female threaded portion 175f decreases, the distance W4 increases, and the distance W1 decreases due to the elastic forces (or biasing forces) of the springs 83.

By changing the distance W1 using the second gap adjuster 184 (i.e., the second gap adjustment screw 184a and the second female threaded portion 175f), it is possible to change the resting position (or the rotational position) of the second lens holder 173 along the first rotational direction R1 (see FIG. 2) relative to the angle adjustment rotation axis Lb. The second laser beam emitter 171 can change the resting position of the conversion lens 74 using the second gap adjuster 184 and also can adjust the position of the conversion lens 74 and the attitude of the conversion lens 74 relative to the optical axis La.

Accordingly, by changing the distance W1 using the second gap adjuster 184, the second laser beam emitter 171 allows the emission direction of the reference laser beam LL from the second laser beam emitter 171 to be close to an ideal emission direction (or a target emission direction) within a first adjustable range V1 shown in FIG. 14.

3. Other Embodiments

Although some embodiments of the present disclosure have been described above, the present disclosure is not limited to the above-described embodiments, but may be implemented in various forms within the scope of the subject matter of the present disclosure.

(3a) While the above-described embodiment has a configuration in which the first lens holder 73 and the second lens holder 173 each include the two conical recesses 73*d*, and the first rotation support 75 and the second rotation support 175 each include the single third conical recess 75*d* and the single V-groove recess 75*e*, the laser line generator of the present disclosure is not limited to such configuration. For example, the first lens holder 73 or the second lens holder 173 may include the single third conical recess 75*d* and the single V-groove recess 75*e*, and the first rotation support 75 and the second rotation support 175 may include the two conical recesses (i.e., the third conical recess 75*d* and a fourth conical recess). That is, the laser line generator of the present disclosure may be such that a lens holder includes a first conical recess and a first V-groove recess, and a rotation support includes a third conical recess and a fourth conical recess.

(3b) While the above-described embodiment has a configuration in which the biasing portion 82 abuts the two portions of the first lens holder 73, and the biasing portion 82 abuts the two portions of the first rotation support 75, the biasing portion 82 may abut a single portion of the first lens holder 73, and the biasing portion 82 may abut a single portion of the first rotation support 75. For example, the biasing portion 82 may include a single spring 83, and the spring 83 may abut both of the first lens holder 73 and the first rotation support 75.

(3c) While the above-described embodiment has a configuration in which the rotation axis 85 includes two spheres 85*a*, the rotation axis 85 is not limited to such configuration. For example, the rotation axis 85 may include two cylindrical members. In this case, the first lens holder 73 and the first rotation support 75 may each include the two V-groove recesses 75*e*, and the two cylindrical members may be arranged between the first lens holder 73 and the first rotation support 75 in abutment with these V-groove recesses 75*e*.

(3d) While the above-described embodiment has a configuration including the first rotation mechanism 71*a* and the second rotation mechanism 72*b*, the laser line generator of the present disclosure is not limited to such configuration, but may include the first rotation mechanism 71*a* without including the second rotation mechanism 72*b*.

(3e) A plurality of functions performed by a single element in the aforementioned embodiments may be achieved by a plurality of elements, or a function performed by a single element may be achieved by a plurality of elements. Also, at least a part of a configuration in the aforementioned embodiments may be replaced with a publicly-known configuration having a similar function. Further, at least a part of a configuration in the aforementioned embodiments may be omitted. Moreover, at least a part of a configuration in the aforementioned embodiments may be added to, or may replace, another configuration in the aforementioned embodiments. Any form included in the technical idea defined only by the language of the claims may be an embodiment of the present disclosure.

What is claimed is:

1. A laser line generator comprising:
  a laser beam source configured to generate an incident laser beam having an optical axis;
  a conversion lens configured to convert the incident laser beam into a reference laser beam that diffuses from the conversion lens in a first plane;
  a lens holder holding the conversion lens;
  a rotation support abutting supporting the lens holder such that the lens holder is rotatable around a rotation axis that is perpendicular to the optical axis and parallel to the first plane;
  a first sphere and a second sphere (i) aligned with the rotation axis and (ii) directly contacting the lens holder and the rotation support;
  a biasing portion (i) abutting the lens holder and the rotation support in a first area and (ii) configured to generate a biasing force to bring the lens holder and the rotation support closer to each other, the first area being on a second plane perpendicular to the optical axis, the second plane being divided into the first area and a second area by the angle adjustment rotation axis; and
  a gap adjuster configured to adjust a gap dimension between the lens holder and the rotation support in the first area.

2. The laser line generator according to claim 1, wherein the lens holder includes a first sphere abutment portion and a second sphere abutment portion,
  the first sphere abutment portion contacts the first sphere,
  the second sphere abutment portion contacts the second sphere,
  the rotation support includes a third sphere abutment portion and a fourth sphere abutment portion,
  the third sphere abutment portion contacts the first sphere, and
  the fourth sphere abutment portion contacts the second sphere.

3. The laser line generator according to claim 2, wherein each of the first sphere and the second sphere includes a first part and a second part,
  the first sphere abutment portion includes a first recess receiving the first part of the first sphere,
  the second sphere abutment portion includes a second recess receiving the first part of the second sphere,
  the third sphere abutment portion includes a third recess receiving the second part of the first sphere, and
  the fourth sphere abutment portion includes a fourth recess receiving the second part of the second sphere.

4. The laser line generator according to claim 3, wherein the first recess and/or the third recess includes a conical recess.

5. The laser line generator according to claim 3, wherein the second recess and/or the fourth recess includes a conical recess or a V-groove recess, and
  the V-groove recess provides a space having a V-shaped groove section.

6. The laser line generator according to claim 1, wherein the biasing portion includes a first fixing end and a second fixing end,
  the first fixing end is fixed to the lens holder,
  the second fixing end is fixed to the rotation support, and
  the biasing portion is configured to be elastically deformed to bring the first fixing end and the second fixing end closer to each other.

7. The laser line generator according to claim 1, wherein the biasing portion abuts two portions of the lens holder and two portions of the rotation support in the first area.

8. The laser line generator according to claim 1, further comprising:
  an optical axis rotation support (i) rotatably supporting the rotation support relative to the optical axis and (ii) separate from the rotation support.

9. The laser line generator according to claim 8, wherein the optical axis rotation support includes a position determiner configured to abut the rotation support to restrict rotation of the rotation support, and
the position determiner is in the second area.

10. The laser line generator according to claim 9, wherein the rotation support includes an engagement portion having an engagement surface that intersects a circumferential direction relative to the optical axis, and
the position determiner is configured to abut the engagement portion directly, or indirectly through an intervening member, to restrict the rotation of the rotation support.

11. The laser line generator according to claim 1, wherein the conversion lens has a cylindrical shape.

12. The laser line generator according to claim 1, wherein
the conversion lens has a cylindrical shape,
the cylindrical shape has a central axis that is not parallel to a third plane, and
the third plane is (i) parallel to the optical axis and (ii) parallel to the angle adjustment rotation axis.

13. A laser line generator comprising:
a laser beam source configured to generate an incident laser beam having an optical axis;
a conversion lens configured to convert the incident laser beam into a reference laser beam that diffuses from the conversion lens in a first plane;
a lens holder holding the conversion lens;
a rotation support supporting the lens holder such that the lens holder is rotatable around a rotation axis that is perpendicular to the optical axis and parallel to the first plane;
a biasing portion (i) abutting the lens holder and the rotation support in a first area and (ii) configured to generate a biasing force to bring the lens holder and the rotation support closer to each other, the first area being on a second plane perpendicular to the optical axis, the second plane being divided into the first area and a second area by the angle adjustment rotation axis; and
a gap adjuster configured to adjust a gap dimension between the lens holder and the rotation support in the first area, wherein:
the gap adjuster includes:
a female-threaded portion in the lens holder or the rotation support; and
a male-threaded portion (i) directly contacting the lens holder and the rotation support, (ii) being screw-engaged with the female-threaded portion, and (iii) including a first abutment portion and a second abutment portion, the first abutment portion contacting the lens holder and the second abutment portion contacting the rotation support, and
the male-threaded portion, the female-threaded portion, the first abutment portion and the second abutment portion are configured such that a distance between the first abutment portion and the second abutment portion changes as a screwing depth of the male-threaded portion relative to the female-threaded portion changes.

14. The laser line generator according to claim 13, wherein the gap adjuster is in the first area.

15. The laser line generator according to claim 14, wherein
the rotation axis includes a first end and a second end,
the lens holder includes an abutting portion configured to contact the gap adjuster,
the biasing portion and the lens holder are configured such that an action center position of the biasing force on the lens holder is within a triangle area, and
apexes of the triangle area correspond to the first end of the rotation axis, the second end of the rotation axis, and the abutting portion.

16. The laser line generator according to claim 14, wherein the gap adjuster, the first abutment portion and the second abutment portion are configured such that the distance between the first abutment portion and the second abutment portion increases as the screwing depth increases.

17. The laser line generator according to claim 13, wherein the gap adjuster is in the second area.

18. The laser line generator according to claim 17, wherein the gap adjuster, the first abutment portion and the second abutment portion are configured such that the distance between the first abutment portion and the second abutment portion decreases as the screwing depth increases.

19. A method for adjusting an angle of a conversion lens in a laser line generator, the method comprising:
supporting, by a rotation support, a lens holder holding the conversion lens such that the lens holder is rotatable around a rotation axis, the conversion lens being configured to convert an incident laser beam into a reference laser beam that diffuses from the conversion lens in a first plane, and the rotation axis being perpendicular to an optical axis of the incident laser beam and parallel to the first plane;
brining a first sphere and a second sphere into direct contact with the lens holder and the rotation support, the first sphere and the second sphere being aligned with the rotation axis;
bringing a biasing portion into contact with the lens holder and the rotation support in a first area, the biasing portion being configured to generate a biasing force to bring the lens holder and the rotation support closer to each other, the first area being on a second plane perpendicular to the optical axis, the second plane being divided into the first area and a second area by the rotation axis;
screw-engaging a male-threaded portion with a female-threaded portion in the first area, the female-threaded portion being in the lens holder or the rotation support, and the male-threaded portion contacting the lens holder and the rotation support; and
adjusting a screwing depth of the male-threaded portion relative to the female-threaded portion.

20. A laser line generator comprising:
a laser beam source configured to generate an incident laser beam having an optical axis;
a conversion lens configured to convert the incident laser beam into a reference laser beam that diffuses from the conversion lens in a first plane;
a lens holder holding the conversion lens;
a rotation support supporting the lens holder such that the lens holder is rotatable around a rotation axis, the rotation axis being perpendicular to the optical axis and parallel to the first plane;
a biasing portion (i) abutting the lens holder and the rotation support in a first area, (ii) deviating from the optical axis, and (iii) configured to generate a biasing force to bring the lens holder and the rotation support closer to each other, the first area being on a second plane perpendicular to the optical axis, the second plane being divided into the first area and a second area by the rotation axis; and a gap adjuster configured to adjust a gap dimension between the lens holder and the rotation support in the first area.

* * * * *